(12) United States Patent
Li et al.

(10) Patent No.: US 12,524,832 B2
(45) Date of Patent: Jan. 13, 2026

(54) IMAGE FRAME SUPER-RESOLUTION IMPLEMENTATION METHOD AND APPARATUS

(71) Applicant: HUAWEI TECHNOLOGIES CO., LTD., Guangdong (CN)

(72) Inventors: Linge Li, Shenzhen (CN); Hao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/151,588

(22) Filed: Jan. 9, 2023

(65) Prior Publication Data

US 2023/0162323 A1 May 25, 2023

Related U.S. Application Data

(63) Continuation of application No. PCT/CN2021/105235, filed on Jul. 8, 2021.

(30) Foreign Application Priority Data

Jul. 10, 2020 (CN) .......................... 202010664759.5

(51) Int. Cl.
*G06K 9/00* (2022.01)
*G06T 3/4053* (2024.01)
(Continued)

(52) U.S. Cl.
CPC .......... *G06T 3/4053* (2013.01); *G06T 7/0002* (2013.01); *G06V 10/28* (2022.01);
(Continued)

(58) Field of Classification Search
CPC .............................. G06T 3/4053; G06V 10/28
See application file for complete search history.

(56) References Cited

U.S. PATENT DOCUMENTS

2023/0099405 A1* 3/2023 Otsuka ................... G06F 3/013
382/232

FOREIGN PATENT DOCUMENTS

| CN | 110099280 A | 8/2019 |
| CN | 110751597 A | 2/2020 |
| CN | 110875906 A | 3/2020 |

OTHER PUBLICATIONS

Guan, Z., Xing, Q., Xu, M., Yang, R., Liu, T., & Wang, Z. (2019). MFQE 2.0: A new approach for multi-frame quality enhancement on compressed video. IEEE transactions on pattern analysis and machine intelligence, 43(3), 949-963. (Year: 2019).*

(Continued)

*Primary Examiner* — Molly Wilburn
*Assistant Examiner* — Aidan Keup

(57) ABSTRACT

An image frame super-resolution implementation method and apparatus are disclosed. The method includes: obtaining super-resolution reference information including a quantization parameter and an image quality score set, and the image quality score set includes image quality scores of a plurality of image frames; selecting M image frames from the plurality of image frames based on the image quality score set, where M is greater than or equal to 1; obtaining a video super-resolution network corresponding to the quantization parameter, where the video super-resolution network has a super-resolution function; and inputting the M image frames and a first image frame into the video super-resolution network, where the video super-resolution network is configured to perform super-resolution processing via the super-resolution function, on the first image frame based on the M image frames to obtain a second image frame, and the resolution of the second image frame is higher than the resolution of the first image frame.

15 Claims, 12 Drawing Sheets

(51) Int. Cl.
*G06T 7/00* (2017.01)
*G06V 10/28* (2022.01)

(52) U.S. Cl.
CPC ............... *G06T 2207/10016* (2013.01); *G06T 2207/20084* (2013.01); *G06T 2207/30168* (2013.01)

(56) References Cited

OTHER PUBLICATIONS

Hori, T., Gong, Z., Watanabe, H., Ikai, T., Chujoh, T., Sasaki, E., & Ito, N. (Jun. 2020). CNN-based super-resolution adapted to quantization parameters. In International Workshop on Advanced Imaging Technology (IWAIT) 2020 (vol. 11515, pp. 336-340 (Year: 2020).*

Office Action issued in CN202010664759.5, dated Aug. 21, 2024, 8 pages.

Armin Kappeler et al: "Video Super-Resolution With Convolutional Neural Networks", IEEE Transactions on Computational Imaging, Mar. 30, 2016, total 14 pages.

Jose Caballero et al: "Real-Time Video Super-Resolution with Spatio-Temporal Networks and MotionCompensation", 2017 IEEE Conference on Computer Vision and Pattern Recognition (CVPR), Nov. 9, 2017, total 10 pages.

Zhifei Zhang et al: "Image Super-Resolution by Neural Texture Transfer", 2019 IEEE/CVF Conference on Computer Vision and Pattern Recognition (CVPR), Jun. 15-20, 2019, total 10 pages.

International Search Report and Written Opinion issued in PCT/CN2021/105235, dated Oct. 9, 2021, 9 pages.

* cited by examiner

IMAGE FRAME SUPER-RESOLUTION IMPLEMENTATION METHOD AND APPARATUS

CROSS-REFERENCE TO RELATED APPLICATIONS

This application continuation of International Application No. PCT/CN2021/105235, filed on Jul. 8, 2021, which claims priority to Chinese Patent Application No. 202010664759.5, filed on Jul. 10, 2020. The disclosures of the aforementioned applications are hereby incorporated by reference in their entireties.

TECHNICAL FIELD

The present disclosure relates to video super-resolution technologies, and in particular, to an image frame super-resolution implementation method and apparatus.

BACKGROUND

With emergence of video application software, people have increasing requirements for high-definition videos and even ultra-high definition (UHD) videos. In multimedia services such as online video playing and live broadcast based on information transmission between a transmit end and a mobile terminal, how to improve coding efficiency, reduce a target bit rate, and improve video playing effect becomes a challenge.

In a related technology, one frame or two frames before and after a current frame are selected, three consecutive frames or five consecutive frames form a group of image sets, and the group of image sets is input to a deep learning network. Finally, a high-resolution image of the current frame is output.

However, when the foregoing method is applied to an actual streaming media service, a frame sequence may need to be compressed to different degrees. Consequently, a quality difference between adjacent frames is large, and super-resolution effect of the current frame is further affected.

SUMMARY

The present disclosure provides an image frame super-resolution implementation method and apparatus, to save a processing resource of a terminal, improve processing efficiency of the terminal, and improve super-resolution processing effect of an image frame.

According to a first aspect, the present disclosure provides an image frame super-resolution implementation method. The method includes: obtaining super-resolution reference information, where the super-resolution reference information includes a quantization parameter and an image quality score set, and the image quality score set includes image quality scores of a plurality of image frames; selecting M image frames from the plurality of image frames based on the image quality score set, where M is greater than or equal to 1; obtaining a video super-resolution network corresponding to the quantization parameter, where the video super-resolution network has a super-resolution function; and inputting the M image frames and a first image frame into the video super-resolution network, where the video super-resolution network is configured to perform super-resolution processing on the first image frame based on the M image frames to obtain a second image frame, and resolution of the second image frame is higher than resolution of the first image frame.

A transmit end has a video stream encoding function, and separately performs encoding processing on each image frame in a video stream. Generally, an encoding process may include image blocking, mode selection, residual calculation, transformation, quantization, inverse quantization, inverse transformation, reconstruction, and filtering. Processing related to the present disclosure includes mode selection, quantization, and reconstruction.

Mode selection is to select partitioning and a prediction mode for an image block. Partitioning means an image frame is partitioned (or divided) into smaller parts, for example, an image block in a square or rectangular shape. The prediction mode may provide the best matching or the minimum residual (the minimum residual means better compression in transmission or storage), provide the minimum signaling overheads (the minimum signaling overheads mean better compression in transmission or storage), or consider or balance both of the above. The prediction mode may include, for example, an intra-frame prediction mode and/or an inter-frame prediction mode. The intra-frame prediction mode is used to generate an intra-frame prediction block by using reconstructed pixels of adjacent blocks in a same current image frame, and output an intra-frame prediction parameter. The inter-frame prediction mode is used to select reconstructed pixels of a reference block from a plurality of reference blocks in a plurality of other image frames to generate an inter-frame prediction block, and output an inter-frame prediction parameter. The transmit end obtains reference frame indication information of the image frame through mode selection, where the reference frame indication information indicates the intra-frame adjacent blocks or the reference block.

Quantization is to quantize a transform residual coefficient through, for example, scalar quantization or vector quantization, to obtain a quantized residual coefficient. A quantization process may reduce a bit depth related to some or all of transform residual coefficients. For example, an n-bit transform residual coefficient may be rounded down to an m-bit transform residual coefficient during quantization, where n is greater than m. A quantization degree may be modified by adjusting a quantization parameter (QP). For example, a proper quantization step may be indicated by using the QP, a smaller quantization parameter may correspond to fine quantization (a smaller quantization step), a larger quantization parameter may correspond to rough quantization (a larger quantization step), and vice versa. Quantization is a lossy operation, where a larger quantization step indicates a larger loss. In a possible implementation, a video encoder may be configured to output the QP, so that a video decoder may receive and use the QP for decoding. The transmit end obtains the quantization parameter of the image frame through quantization.

Reconstruction is a process of performing inverse quantization and inverse transformation on the quantized residual coefficient (obtained after a residual block is transformed and quantized) to obtain a reconstructed residual block, and then adding the reconstructed residual block to a prediction block to obtain a reconstructed block in a pixel domain. An image frame obtained by the transmit end in the reconstruction process is a reconstructed frame, and an image quality score of the image frame may further be obtained based on a difference between the reconstructed frame and an original image frame. For example, the transmit end may obtain an image quality score of the first image frame based on a peak signal-to-noise ratio (PSNR), structural similarity index measure (structural similarity, SSIM), or video multimethod assessment fusion (VMAF).

The PSNR may be calculated according to the following formula:

$$PSNR = 10 \times \log_{10}\left(\frac{(2^n-1)^2}{MSE}\right)$$

$$MSE = \sqrt{\frac{1}{M \times N}\sum_{i=1}^{M}\sum_{j=1}^{N}(x(i,j)-x'(i,j))^2},$$

where $x(i,j)$ represents pixel values of the $i^{th}$ row and the $j^{th}$ column in the first image frame, $x'(i,j)$ represents pixel values of the $i^{th}$ row and the $j^{th}$ column in a reconstructed frame of the first image frame, and the resolution of the first image is M×N. In the present disclosure, the PSNR obtained through calculation may be used as the image quality score of the first image frame.

A calculation formula of the SSIM is based on three comparison measures between the first image frame x and the reconstructed frame y of the first image frame: luminance $l(x,y)$, contrast $c(x,y)$, and a structure $s(x,y)$, to be specific, $$l(x,y) = \frac{2\mu_x\mu_y + c_1}{\mu_x^2 + \mu_y^2 + c_1}$$

$$c(x,y) = \frac{2\sigma_x\sigma_y + c_2}{\sigma_x^2 + \sigma_y^2 + c_2}$$

$$s(x,y) = \frac{\sigma_{xy} + c_3}{\sigma_x\sigma_y + c_3}$$

$c_3=c_2/2$, $\mu_x$ represents a divided difference of x, $\mu_y$ represents a divided difference of y, $\sigma_x^2$ represents a variance of x, $\sigma_y^2$ represents a variance of y, $\sigma_{xy}$ represents a covariance of x and y, $c_1=(k_1L)^2$, $c_2=(k_2L)^2$, L represents a pixel value range, $k_1=0.01$, and $k_2=0.03$. That is, $$SSIM(x,y)=[l(x,y)^\alpha \cdot c(x,y)^\beta \cdot s(x,y)^\gamma]$$

It is assumed that $\alpha$, $\beta$, and $\gamma$ are all 1, and the following may be obtained:

$$SSIM(x,y) = \frac{(2\mu_x\mu_y + c_1)(2\sigma_x\sigma_y + c_2)}{(\mu_x^2 + \mu_y^2 + c_1)(\sigma_x^2 + \sigma_y^2 + c_2)}$$

In each calculation, an N×N window may be selected from the image frame, then a sliding window operation is performed on the window, and finally an average value is used as SSIM of the entire image frame. In the present disclosure, the SSIM obtained through calculation may be used as the image quality score of the first image frame.

The VMAF is a model trained through machine learning, and may score an input image frame. In other words, a to-be-scored image frame is input, and the model directly outputs an image quality score of the image frame.

In the present disclosure, the super-resolution reference information is obtained by the transmit end and transmitted to a terminal. The terminal may obtain M image frames based on the super-resolution reference information, and input the M image frames and the to-be-processed first image frame into the video super-resolution network, to perform super-resolution processing on the first image frame. Based on this, the transmit end may add the quantization parameter, the image quality score, and the reference frame indication information to the super-resolution reference information, and the three pieces of information are used when the terminal selects the M image frames.

In addition to the video stream encoding function, the transmit end further has a neural network training capability. To be specific, the video super-resolution network used in the present disclosure is obtained through training by the transmit end. Before the terminal performs the image frame super-resolution implementation method provided in the present disclosure, a trained video super-resolution network has been downloaded from the transmit end. The transmit end may train different video super-resolution networks for one or more quantization parameters. In this way, there is a correspondence between the quantization parameter and the video super-resolution network. The correspondence may be a one-to-one correspondence (one quantization parameter corresponds to one video super-resolution network) or a many-to-one correspondence (a plurality of quantization parameters corresponds to one video super-resolution network). After obtaining one quantization parameter from the super-resolution reference information, the terminal may obtain, based on the quantization parameter, a video super-resolution network corresponding to the quantization parameter.

Super-resolution is a process of obtaining a high-resolution image frame by using a plurality of low-resolution image frames. This can improve resolution of an original image. Resolution means an amount of information stored in an image frame, and represents a quantity of pixels included in an image per inch. A unit of resolution is pixels per inch (PPI). Higher resolution indicates more pixels included per inch. Super-resolution processing is to increase a quantity of pixels included per inch, so that details of the image frame become rich, and definition of the image frame is improved. In the present disclosure, a trained neural network may be used to implement a super-resolution function.

Optionally, in the present disclosure, the super-resolution function may alternatively be implemented by using an image processing algorithm, or the super-resolution function may be implemented by using another method. This is not specifically limited.

In the present disclosure, the terminal selects, based on the super-resolution reference information from the transmit end, the to-be-used video super-resolution network, and selects a reference image frame used in super-resolution processing, to perform super-resolution processing on the first image frame (namely, a to-be-super-resolution processed image frame), and improve the resolution of the first image frame. On one hand, the terminal selects the corresponding video super-resolution network based on the quantization parameter of the first image frame, so that the resolution can be better improved. On the other hand, the reference image frame is selected by using a score evaluated by the transmit end for each image frame, to maximize quality after multi-frame fusion and super-resolution are performed, and improve effect of super-resolution processing on the image frame. On the third hand, a resource of the transmit end is used to score the image frame in the video stream, so that a processing resource of the terminal can be saved, a computation amount of the terminal can be reduced, and super-resolution processing efficiency of the terminal can be improved.

In a possible implementation, the selecting M image frames from the plurality of image frames based on the image quality score set specifically includes: when the plurality of image frames include a first image frame set, and a quantity of image frames in the first image frame set is greater than or equal to M, selecting the M image frames from the first image frame set, where image quality scores of the image frames included in the first image frame set each are higher than the image quality score of the first image frame.

M is a quantity of reference image frames that need to be used when the super-resolution video network performs super-resolution processing, and is related to training data used when the transmit end trains the super-resolution video network. This is not specifically limited in the present disclosure. The M image frames are selected from the plurality of image frames whose image quality scores are obtained, and image quality scores of the M image frames each are higher than the image quality score of the first image frame. This meets a requirement of super-resolution processing, in other words, super-resolution processing is performed on a to-be-super-resolution processed image frame by using an image frame with a high score.

In a possible implementation, the M image frames include the first M image frames that are obtained after the image frames in the first image frame set are arranged in descending order of image quality scores.

In addition to the foregoing conditions, higher scores of the selected M image frames are more conducive to improving the super-resolution effect. Therefore, further, M image frames with the highest scores may be selected from the plurality of image frames whose scores are higher than that of the first image frame.

In a possible implementation, the super-resolution reference information further includes reference frame indication information of the first image frame. The selecting M image frames from the plurality of image frames based on the image quality score set further includes: when the plurality of image frames include the first image frame set, and the quantity of image frames in the first image frame set is less than M, selecting all image frames from the first image frame set, where the image quality scores of the image frames included in the first image frame set each are higher than the image quality score of the first image frame; when a quantity of all the image frames is less than M, selecting image frames corresponding to the reference frame indication information from the plurality of image frames; and when a sum of the quantity of all the image frames and a quantity of image frames corresponding to the reference frame indication information is less than M, selecting, from image frames other than all the image frames and the image frames corresponding to the reference frame indication information in the plurality of image frames, at least one image frame whose time intervals between the at least one image frame and the first image frame are in ascending order until the M image frames are selected.

Because the super-resolution video network needs to input the M image frames to complete super-resolution processing on the first image frame, if the quantity of all image frames whose image quality scores are higher than that of the first image frame is less than M, in addition to selecting all the image frames whose image quality scores are higher than that of the first image frame, an image frame may be alternatively obtained in another manner, to supplement the M image frames. The reference frame of the first image frame is an optional object, and the reference frame is a reference frame (an intra-frame reference frame or an inter-frame reference frame) selected when the transmit end performs mode selection on the first image frame. Because the reference frame may be used to predict the first image frame during encoding, when super-resolution processing is performed on the first image frame, the reference frame may also be used as a reference image frame. If the sum of the quantity of all the image frames whose image quality scores are higher than that of the first image frame and the quantity of reference frames of the first image frame still cannot reach M, the image frames whose time intervals between the image frames and the first image frame are in ascending order are selected from the plurality of image frames.

In other words, the first image frame is used as a start point, and image frames are selected frame by frame from the first image frame forward and backward. For example, a sequence number of the first image frame is n. If it is assumed that four image frames further need to be selected, the four image frames may be n−2, n−1, n+1, and n+2. If the four image frames include an image frame that has been selected, a next image frame continues to be selected. For example, if n+1 and n−1 have been selected, n−3 and n+3 may be further selected. Alternatively, if n−1 and n−2 have been selected, n−3 and n+3 may be further selected.

It should be noted that, there is a possibility that when all the image frames whose image quality scores are higher than that of the first image frame are selected, the reference frames of the first image frame are already included. In this case, the image frames may be directly selected from the plurality of image frames in the ascending order of time intervals between the image frames and the first image frame.

In a possible implementation, the super-resolution reference information further includes the reference frame indication information of the first image frame. The selecting M image frames from the plurality of image frames based on the image quality score set further includes: when the plurality of image frames do not include the first image frame set, determining whether the first image frame is an I frame, where the image quality scores of the image frames included in the first image frame set each are higher than the image quality score of the first image frame, and if the first image frame is the I frame, the M image frames include M replicated samples of the first image frame; if the first image frame is not the I frame, selecting the image frames corresponding to the reference frame indication information from the plurality of image frames; and when the quantity of image frames corresponding to the reference frame indication information is less than M, selecting, from image frames other than the image frames corresponding to the reference frame indication information in the plurality of image frames, the at least one image frame whose time intervals between the at least one image frame and the first image frame are in ascending order until the M image frames are selected.

During video encoding, image frames can be classified into an I frame, a P frame, and a B frame based on a prediction type. The I frame is an image frame for independent static image encoding and provides a random access point in a video stream. The P frame is an image frame predicted by using a previous I frame or P frame adjacent to the P frame as a reference frame, and can be used as a reference frame of a subsequent P frame or B frame. The B frame is an image frame obtained by performing bidirectional prediction by using two adjacent frames (which may be an I frame or a P frame) as reference frames.

If the first image frame is the I frame, two cases may occur. One case is that scene switching occurs, and the first image frame is the beginning of another scene. In this case, content of a previous scene is different from that of a current scene, and information of an image frame in the previous scene cannot be used. The other case is that the first image frame is an I frame inserted at a fixed interval. In this case, the quantization parameter of the first image frame is usually lower than that of a surrounding image frame, and image quality of the first image frame may be much higher than that of the surrounding image frame. Therefore, information of the surrounding image frame cannot be used. Based on the two cases, if the first image frame is the I frame, it is likely that a reference image frame that can be used for super-resolution processing cannot be found from surrounding image frames. In the present disclosure, to meet an input requirement of the video super-resolution network, the first image frame may be replicated for a plurality of times to obtain the M replicated samples. Information and data of each replicated sample are consistent with information and data of the first image frame. Then, the M replicated samples are input into the video super-resolution network. This is equivalent to that information and data of the M image frames are input, and the information and the data of the M image frames are the same.

If the first image frame is not the I frame, and there is no image frame whose image quality score is higher than that of the first image frame in the surrounding image frames, the image frame may be obtained in another manner, to supplement the M image frames. As described above, the reference frame of the first image frame may be selected. If the quantity of image frames is still less than M in this case, the image frames whose time intervals between the image frames and the first image frame are in ascending order are selected from the plurality of image frames. In other words, the first image frame is used as the start point, and the image frames are selected frame by frame from the first image frame forward and backward. For example, the sequence number of the first image frame is n. If it is assumed that four image frames further need to be selected, the four image frames may be n−2, n−1, n+1, and n+2. If the four image frames include the image frame that has been selected, the next image frame continues to be selected. For example, if n+1 and n−1 have been selected, n−3 and n+3 may be further selected. Alternatively, if n−1 and n−2 have been selected, n−3 and n+3 may be further selected.

In a possible implementation, the obtaining super-resolution reference information specifically includes: receiving the super-resolution reference information sent by the transmit end.

After encoding the video stream, the transmit end obtains a bitstream of the video stream. In one case, during encoding, the transmit end encodes both data of the image frame and the super-resolution reference information that are in the video stream, for example, the quantization parameter, the image quality score, and the reference frame indication information, to obtain a bitstream including the data of the image frame and the super-resolution reference information; and transmits the bitstream to the terminal. In another case, the transmit end encodes the data of the image frame in the video stream to obtain a bitstream of the image frame, then encodes the super-resolution reference information to obtain a bitstream of the super-resolution reference information, splices the bitstream of the image frame and the bitstream of the super-resolution reference information, and transmits a spliced bitstream to the terminal. An implementation of the bitstream is not specifically limited in the present disclosure.

In a possible implementation, the plurality of image frames includes a plurality of consecutive image frames in the video stream, and the plurality of image frames include the first image frame.

That the plurality of alternative image frames includes the first image frame means that the plurality of image frames are arranged before and/or after the first image frame in the video stream. A shorter time interval between an image frame and the first image frame means higher association between the image frame and the first image frame. If an image is a slow-mo image or even still image, two adjacent image frames in the image may be almost the same. Therefore, when the M image frames are selected, a range of the plurality of image frames may be first limited. For example, the first image frame is located in a middle position (a center or a specified range in the middle) of the plurality of image frames. Regardless of which method is used to select the M image frames, the range is not exceeded. A case in which a selected image frame may have a very high image quality score, but is far away from the first image frame in terms of time, a reference value is lost, and super-resolution effect is poor is also avoided.

In a possible implementation, the video super-resolution network includes a convolutional neural network (CNN), a deep neural network (DNN), or a recurrent neural network (RNN).

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

According to a second aspect, the present disclosure provides an image frame super-resolution implementation method. The method includes: obtaining a quantization parameter of a first image frame; obtaining an image quality score of the first image frame based on the first image frame and a reconstructed frame of the first image frame; and sending a video stream and super-resolution reference information to a terminal, where the video stream includes the first image frame, and the super-resolution reference information includes the quantization parameter and the image quality score.

For obtaining of the quantization parameter and the image quality score, refer to the first aspect. Details are not described herein again.

In the present disclosure, in a process of encoding the video stream, a transmit end obtains the quantization parameter and the image quality score of the first image frame in the video stream, adds the quantization parameter and the image quality score to the super-resolution reference information, and sends the super-resolution reference information to the terminal, to perform super-resolution processing on the first image frame (namely, a to-be-super-resolution processed image frame), and improve resolution of the first image frame. On one hand, a video super-resolution network corresponds to the quantization parameter, so that the resolution can be better improved. On the other hand, the transmit end scores each image frame, and uses a score as a basis for selecting a reference image frame, to maximize quality after multi-frame fusion and super-resolution are performed, and improve effect of super-resolution processing on the image frame. On the third hand, a resource of the transmit end is used to score the image frame in the video stream, so that a processing resource of the terminal can be saved, a computation amount of the terminal can be reduced, and super-resolution processing efficiency of the terminal can be improved.

In a possible implementation, before the sending a video stream and super-resolution reference information to a terminal, the method further includes: obtaining reference frame indication information of the first image frame. Correspondingly, the super-resolution reference information further includes the reference frame indication information.

In a possible implementation, the obtaining an image quality score of the first image frame based on the first image frame and a reconstructed frame of the first image frame specifically includes: obtaining the image quality score of the first image frame based on a peak signal-to-noise ratio (PSNR), structural similarity index measure (SSIM), or video multimethod assessment fusion (VMAF).

In a possible implementation, the video super-resolution network includes a convolutional neural network (CNN), a deep neural network (DNN), or a recurrent neural network RNN.

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

In a possible implementation, the method further includes: obtaining a training data set, where the training data set includes a first-resolution image and a second-resolution image of each of a plurality of image frames, and a plurality of quantization parameters; and resolution of the first-resolution image is higher than resolution of the second-resolution image; and performing training based on the training data set to obtain a plurality of video super-resolution networks, where the plurality of video super-resolution networks correspond to the plurality of quantization parameters.

When training the video super-resolution network, the transmit end collects the training data set, where the training data set includes high-resolution images and low-resolution images (which may include a plurality of low-resolution images) of the plurality of image frames, and the quantization parameters of the plurality of image frames. A same downsampling method and a same compression method are used for the high-resolution images of the plurality of image frames to obtain the corresponding low-resolution images. A training engine may learn, based on the high-resolution images and the low-resolution images of the plurality of image frames and a correspondence between the high-resolution images and the low-resolution images, a rule of how to process a high-resolution image into a low-resolution image. In addition, a correspondence between the rule and the quantization parameter further forms a plurality of video super-resolution networks corresponding to different quantization parameters.

According to a third aspect, the present disclosure provides an image frame super-resolution implementation method. The method includes: A transmit end obtains a quantization parameter of a first image frame, and obtains an image quality score of the first image frame based on the first image frame and a reconstructed frame of the first image frame. The transmit end sends a video stream and super-resolution reference information to a terminal, where the video stream includes the first image frame, and the super-resolution reference information includes the quantization parameter and the image quality score. The terminal obtains the first image frame based on the video stream, and obtains the quantization parameter and an image quality score set based on the super-resolution reference information, where the image quality score set includes image quality scores of a plurality of image frames. The terminal selects M image frames from the plurality of image frames based on the image quality score set, where M is greater than or equal to 1. The terminal obtains a video super-resolution network corresponding to the quantization parameter, where the video super-resolution network has a super-resolution function. The terminal inputs the M image frames and the first image frame into the video super-resolution network, where the video super-resolution network is configured to perform super-resolution processing on the first image frame based on the M image frames to obtain a second image frame, and resolution of the second image frame is higher than resolution of the first image frame.

In the present disclosure, the terminal selects, based on the super-resolution reference information from the transmit end, the to-be-used video super-resolution network, and selects a reference image frame used in super-resolution processing, to perform super-resolution processing on the first image frame (namely, a to-be-super-resolution processed image frame), and improve the resolution of the first image frame. On one hand, the terminal selects the corresponding video super-resolution network based on the quantization parameter of the first image frame, so that the resolution can be better improved. On the other hand, the reference image frame is selected by using a score evaluated by the transmit end for each image frame, to maximize quality after multi-frame fusion and super-resolution are performed, and improve effect of super-resolution processing on the image frame. On the third hand, a resource of the transmit end is used to score the image frame in the video stream, so that a processing resource of the terminal can be saved, a computation amount of the terminal can be reduced, and super-resolution processing efficiency of the terminal can be improved.

According to a fourth aspect, the present disclosure provides a terminal apparatus. The terminal apparatus includes: an obtaining module, configured to obtain super-resolution reference information, where the super-resolution reference information includes a quantization parameter and an image quality score set, and the image quality score set includes image quality scores of a plurality of image frames; select M image frames from the plurality of image frames based on the image quality score set, where M is greater than or equal to 1; and obtain a video super-resolution network corresponding to the quantization parameter, where the video super-resolution network has a super-resolution function; and a processing module, configured to input the M image frames and a first image frame into the video super-resolution network, where the video super-resolution network is configured to perform super-resolution processing on the first image frame based on the M image frames to obtain a second image frame, and resolution of the second image frame is higher than resolution of the first image frame.

In a possible implementation, the obtaining module is specifically configured to: when the plurality of image frames include a first image frame set, and a quantity of image frames in the first image frame set is greater than or equal to M, select the M image frames from the first image frame set, where image quality scores of the image frames included in the first image frame set each are higher than an image quality score of the first image frame.

In a possible implementation, the M image frames include the first M image frames that are obtained after the image frames in the first image frame set are arranged in descending order of image quality scores.

In a possible implementation, the super-resolution reference information further includes reference frame indication information of the first image frame. The obtaining module is further configured to: when the plurality of image frames include the first image frame set, and the quantity of image frames in the first image frame set is less than M, select all image frames from the first image frame set, where the image quality scores of the image frames included in the first image frame set each are higher than the image quality score of the first image frame; when a quantity of all the image frames is less than M, select image frames corresponding to the reference frame indication information from the plurality of image frames; and when a sum of the quantity of all the image frames and a quantity of image frames corresponding to the reference frame indication information is less than M, select, from image frames other than all the image frames and the image frames corresponding to the reference frame indication information in the plurality of image frames, at least one image frame whose time intervals between the at least one image frame and the first image frame are in ascending order until the M image frames are selected.

In a possible implementation, the super-resolution reference information further includes the reference frame indication information of the first image frame. The obtaining module is further configured to: when the plurality of image frames do not include the first image frame set, determine whether the first image frame is an I frame, where the image quality scores of the image frames included in the first image frame set each are higher than the image quality score of the first image frame, and if the first image frame is the I frame, the M image frames include M replicated samples of the first image frame; if the first image frame is not the I frame, select the image frames corresponding to the reference frame indication information from the plurality of image frames; and when the quantity of image frames corresponding to the reference frame indication information is less than M, select, from image frames other than the image frames corresponding to the reference frame indication information in the plurality of image frames, the at least one image frame whose time intervals between the at least one image frame and the first image frame are in ascending order until the M image frames are selected.

In a possible implementation, the obtaining module is specifically configured to receive the super-resolution reference information sent by a transmit end.

In a possible implementation, the quantization parameter includes a quantization parameter used in a process in which the transmit end performs quantization processing on the first image frame.

In a possible implementation, the plurality of image frames include a plurality of consecutive image frames in the video stream, and the plurality of image frames include the first image frame.

In a possible implementation, the video super-resolution network includes a convolutional neural network (CNN), a deep neural network (DNN), or a recurrent neural network (RNN).

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

According to a fifth aspect, the present disclosure provides a transmit apparatus. The transmit apparatus includes: an obtaining module, configured to: obtain a quantization parameter of a first image frame; and obtain an image quality score of the first image frame based on the first image frame and a reconstructed frame of the first image frame; and a sending module, configured to send a video stream and super-resolution reference information to a terminal apparatus, where the video stream includes the first image frame, and the super-resolution reference information includes the quantization parameter and the image quality score.

In a possible implementation, the obtaining module is further configured to obtain reference frame indication information of the first image frame. Correspondingly, the super-resolution reference information further includes the reference frame indication information.

In a possible implementation, the obtaining module is specifically configured to obtain the image quality score of the first image frame based on a peak signal-to-noise ratio (PSNR), structural similarity index measure (SSIM), or video multimethod assessment fusion (VMAF).

In a possible implementation, the video super-resolution network includes a convolutional neural network (CNN), a deep neural network (DNN), or a recurrent neural network (RNN).

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

In a possible implementation, the apparatus further includes a training module. The obtaining module is further configured to: obtain a training data set, where the training data set includes a first-resolution image and a second-resolution image of each of a plurality of image frames, and a plurality of quantization parameters. Resolution of the first-resolution image is higher than resolution of the second-resolution image. The training module is configured to perform training based on the training data set to obtain a plurality of video super-resolution networks, where the plurality of video super-resolution networks corresponds to the plurality of quantization parameters.

According to a sixth aspect, the present disclosure provides an image processing system. The image processing system includes a transmit apparatus and a terminal apparatus, where the transmit apparatus is the apparatus according to any implementation of the fifth aspect, and the terminal apparatus is the apparatus according to any implementation of the fourth aspect.

According to a seventh aspect, the present disclosure provides a terminal. The terminal includes one or more processors; and a memory, configured to store one or more programs. When the one or more programs are executed by the one or more processors, the one or more processors are enabled to implement the method according to any implementation of the first aspect.

According to an eighth aspect, the present disclosure provides a transmit end. The transmit end includes one or more processors; and a memory, configured to store one or more programs. When the one or more programs are executed by the one or more processors, the one or more processors are enabled to implement the method according to any implementation of the second aspect.

According to a ninth aspect, the present disclosure provides a computer-readable storage medium including a computer program. When the computer program is executed on a computer, the computer is enabled to perform the method according to any implementation in the first to third aspects.

DESCRIPTION OF EMBODIMENTS

To make the objectives, technical solutions, and advantages of the present disclosure clearer, the following clearly and completely describes the technical solutions in the present disclosure with reference to the accompanying drawings in the present disclosure. It is clear that, the described embodiments are merely some rather than all of the present disclosure. All other embodiments obtained by people of ordinary skill in the art based on embodiments of the present disclosure without creative efforts shall fall within the protection scope of the present disclosure.

In the specification, embodiments, claims, and accompanying drawings of the present disclosure, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in the present disclosure, "at least one (item)" means one or more and "a plurality of" means two or more. "And/or" is used to describe an association relationship between associated objects, and indicates that any of three relationships may exist. For example, "A and/or B" may indicate that only A exists, only B exists, or both A and B exist. Herein, A or B may be singular or plural. The character "/" usually indicates an "or" relationship between the associated objects. In addition, "at least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Figure 1:
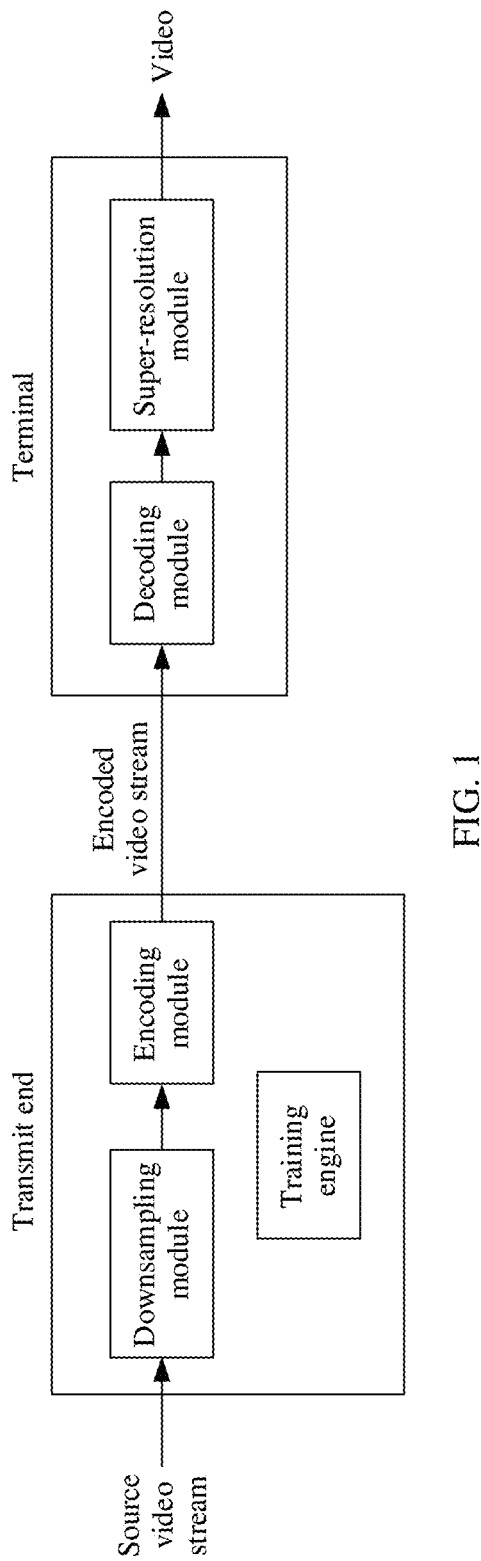
FIG. 1 is an example schematic diagram of an architecture to which an image frame super-resolution implementation method is applied according to the present disclosure.

FIG. 1 is an example schematic diagram of an architecture to which an image frame super-resolution implementation method is applied according to the present disclosure. As shown in FIG. 1, the application framework includes a transmit end and a terminal. The transmit end may be, for example, a cloud, or may be another device or server that has an image encoding function. The transmit end and the terminal may be connected by using a wireless communication network. The transmit end includes a downsampling module and an encoding module. The downsampling module is configured to perform downsampling processing on each image frame in an input source video stream; and may use methods such as nearest neighbor interpolation, bilinear interpolation, and bicubic interpolation. A scale of downsampling is one half, one quarter, or the like. This is not specifically limited in the present disclosure. The encoding module is configured to encode data of a downsampled image frame to obtain a video bitstream. The terminal includes a decoding module and a super-resolution module. The decoding module is configured to decode a received video bitstream to obtain data of an image frame, and then perform reconstruction based on the data of the image frame to obtain a video stream including a reconstructed image frame sequence. Types of encoding/decoding modules used in the present disclosure include but are not limited to H.264/265, and a specific encoding/decoding manner and parameter are not specifically limited.

The transmit end further includes a training engine, and the training engine is configured to train a video super-resolution network to perform super-resolution processing on a reconstructed image frame.

Training data in the present disclosure includes a training data set. The training data set includes high-resolution images and low-resolution images (which may include a plurality of low-resolution images) of a plurality of image frames, and quantization parameters of the plurality of image frames. A same downsampling method and a same compression method are used for the high-resolution images of the plurality of image frames to obtain the corresponding low-resolution images. The training engine may learn, based on the high-resolution images and the low-resolution images of the plurality of image frames and a correspondence between the high-resolution images and the low-resolution images, a rule of how to process a high-resolution image into a low-resolution image. In addition, a correspondence between the rule and the quantization parameter further forms a plurality of video super-resolution networks corresponding to different quantization parameters.

In a process of processing a video into a bitstream, resolution of the video undergoes two degradation processes: downsampling and encoding. A degradation degree of downsampling is the same for all image frames in the video stream, but a degradation degree of encoding distortion varies based on different quantization parameters. Therefore, during video super-resolution network training, the training engine of the transmit end trains different video super-resolution networks based on different quantization parameters, so that the terminal can better restore super-resolution of the video. It can be seen that, when performing super-resolution processing on an image frame based on a video super-resolution network, the terminal needs to determine the corresponding video super-resolution network based on a QP used when quantization processing is performed on the image frame.

The training data may be stored in a database (not shown in the figure), and the training engine performs training based on the training data to obtain a neural network, for example, the video super-resolution network. It should be noted that a source of the training data is not limited in this embodiment of the present disclosure. For example, the training data may be obtained from the transmit end or another device for training.

The video super-resolution network can be configured to implement the image frame super-resolution implementation method provided in this embodiment of the present disclosure. To be specific, the terminal inputs the reconstructed image frame into the video super-resolution network based on related information of the transmit end, to obtain a high-resolution image frame. The following describes the video super-resolution network in detail with reference to FIG. 2a to FIG. 2e.

The video super-resolution network obtained through training by the training engine may be used in the application framework shown in FIG. 1, especially to the transmit end. The training engine may perform training at the transmit end to obtain the video super-resolution network, and then the terminal downloads the video super-resolution network from the transmit end and uses the video super-resolution network. For example, the training engine obtains the video super-resolution network through training. The terminal downloads the video super-resolution network from the transmit end, and then may perform super-resolution processing on the input reconstructed image frame based on the video super-resolution network to obtain the high-resolution image frame.

The transmit end may be a server, for example, a streaming media server or a video website server.

The terminal may be, for example, a mobile phone or a tablet computer (pad), or may be a computer with a wireless transceiver function, a virtual reality (VR) device, or an augmented reality (AR) device. This is not limited in the present disclosure.

It should be noted that the transmit end and the terminal may be independent devices, and each device implements a corresponding function. Optionally, the transmit end and the terminal may alternatively be used as a whole to interact with each other to implement a corresponding function. The transmit end may use the apparatus shown in FIG. 8, and the terminal may use the apparatus shown in FIG. 7.

In a possible implementation, the framework shown in FIG. 1 may be used in the following application scenarios:

1. The transmit end provides a video library. When a user starts video playing software on the terminal and selects a video to be played, the terminal sends a playing request to the transmit end, where the request carries identification information of the video. The transmit device obtains the corresponding video based on the identification information, and sends a video obtained through encoding and compression to the terminal. To increase a bit rate, the transmit end may perform downsampling processing on a video stream, and the terminal plays the video stream. When the user feels that an image is unclear, the user selects higher resolution by using a control provided by the video playing software. After receiving a resolution change instruction, the terminal performs super-resolution processing on each image frame in the video stream by using the method provided in the present disclosure, to improve video resolution.

2. When playing an online video, the terminal finds that the video can still be played with higher resolution. In this case, the terminal actively performs super-resolution processing on each image frame in the video stream by using the method provided in the present disclosure, to improve video resolution.

3. A video comes from another device. For example, the video is stored on another computer or terminal. The video playing software provides a function of playing the video while receiving the video. In other words, when the terminal receives a video stream with sufficient data volume, the video playing software can start to play the video. In this case, resolution of the video may be improved through user selection or active triggering by the terminal. The terminal performs super-resolution processing on each image frame in the video stream by using the method provided in the present disclosure, to improve the resolution of the video.

It should be noted that the foregoing examples describe several scenarios to which the image frame super-resolution implementation method provided in the present disclosure may be applied. However, this does not constitute a limitation on an application scenario of the present disclosure, and the method provided in the present disclosure may be used in any scenario having a video encoding/decoding requirement, a video transmission requirement, and a video playing requirement. This is not specifically limited.

Because this embodiment of the present disclosure relates to application of a neural network, for ease of understanding, the following first explains and describes some nouns or terms used in this embodiment of the present disclosure. The nouns or terms are also used as a part of invention content.

(1) Neural Network

The neural network (NN) is a machine learning model. The neural network may include a neuron. The neuron may be an operation unit that uses $x_s$ and an intercept of 1 as input. Output of the operation unit may be as follows:

$$h_{w,b}(x)=f(W^T x)=f(\Sigma_{s=1}^{n} W_s x_s + b)$$

s=1, 2, . . . , and n, n is a natural number greater than 1, $W_s$ is a weight of $x_s$, and b is a bias of the neuron. F is an activation function of the neuron, and is used to introduce a nonlinear characteristic into the neural network to convert an input signal in the neuron into an output signal. The output signal of the activation function may be used as input of a next convolutional layer. The activation function may be a sigmoid function. The neural network is a network constituted by connecting a plurality of single neurons together. To be specific, output of a neuron may be input of another neuron. Input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. There is no special metric for "a plurality of" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is definitely connected to any neuron in an (i+1)th layer. Although the DNN seems complex, work of each layer is actually not complex, which is simply shown in the following linear relationship expression:

$$\vec{y} = \alpha(W\vec{x} + \vec{b}), \text{ where}$$

$\vec{x}$ is an input vector, $\vec{y}$ is an output vector, $\vec{b}$ is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. Because the DNN has the plurality of layers, there are also a plurality of coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $w_{24}^3$. The superscript 3 represents a layer at which the coefficient W is located, and the subscript corresponds to an output third-layer index 2 and an input second-layer index 4. It is concluded that, a coefficient from a $k^{th}$ neuron at an $(L-1)^{th}$ layer to a $j^{th}$ neuron at a Lth layer is defined as $W_j^{kL}$. It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at a plurality of layers).

(3) Convolutional Neural Network

The convolutional neural network (CNN) is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input image. The convolutional neural network includes a feature extractor constituted by a convolutional layer and a pooling layer. The feature extractor may be considered as a filter. A convolution process may be considered as using a trainable filter to perform convolution on an input image or a convolutional feature plane (feature map).

The convolutional layer is a neuron layer that is in the convolutional neural network and at which convolution processing is performed on an input signal. The convolutional layer may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix is usually used to process pixels at a granularity level of one pixel (or two pixels, depending on a value of a stride) in a horizontal direction on the input image, to extract a specific feature from the image. A size of the weight matrix needs to be related to a size of the image. It should be noted that a depth dimension of the weight matrix is the same as a depth dimension of the input image. During the convolution operation, the weight matrix extends to an entire depth of the input image. Therefore, convolution with a single weight matrix generates convolution output of a single depth dimension. However, in most cases, the single weight matrix is not used, but instead, a plurality of weight matrices of a same size (rows×columns), namely, a plurality of homogeneous matrices, are used. Output of the weight matrices is stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and still another weight matrix is used to blur unnecessary noise in the image. Sizes of the plurality of weight matrices (rows×columns) are the same. Sizes of feature maps extracted from the plurality of weight matrices with the same size are also the same, and then the plurality of extracted feature maps with the same size are combined to form output of the convolution operation. Weight values in these weight matrices need to be obtained through a large amount of training in actual application. Each weight matrix including weight values obtained through training may be used to extract information from an input image, so that the convolutional neural network performs correct prediction. When the convolutional neural network has a plurality of convolutional layers, a large quantity of general features is usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a specific range, to generate an average value. The average value is used an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

(4) Recurrent Neural Network

The recurrent neural network (RNN) is used to process sequence data. A conventional neural network model starts from an input layer to a hidden layer and then to an output layer, and the layers are fully connected, while nodes in each layer are unconnected. Although this ordinary neural network resolves many problems, it is still incompetent to many problems. For example, if it is expected to predict a next word in a sentence, a preceding word usually needs to be used, because words in a sentence are not independent. A reason why the RNN is referred to as the recurrent neural network is that current output of a sequence is also related to previous output of the sequence. A specific representation form is that a network memorizes previous information and applies the previous information to calculation of current output. To be specific, nodes at the hidden layer are connected, and input of the hidden layer not only includes output of the input layer, but also includes output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, output in each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and input and output are also independent, such as a cat and a dog. However, in the real world, a plurality of elements is interconnected. For example, the stock changes with time. For another example, a person says "I like traveling, and the most favorite place is Yunnan. In the future, when there is a chance, I will go to (_). Herein, people should know that the person will go to "Yunnan", because people perform inference from the context. However, how do machines do that? Then, the RNN emerges. The RNN is intended to make the machine capable of memorizing like the human. Therefore, output of the RNN needs to depend on current input information and historical memorized information.

(5) Loss Function

In a process of training the deep neural network, because it is expected that output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is the loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(7) Generative Adversarial Network

The generative adversarial network (GAN) is a deep learning model. The model includes at least two modules: a generative model and a discriminative model. The two modules learn from each other through gaming, to generate better output. Both the generative model and the discriminative model may be neural networks, and may be specifically deep neural networks or convolutional neural networks. A basic principle of the GAN is as follows: A GAN for generating an image is used as an example. It is assumed that there are two networks: G (generator) and D (discriminator). G is a network for generating an image. G receives random noise z, and generates an image based on the noise, where the image is denoted as G(z). D is a discriminative network and used to determine whether an image is "real". An input parameter of D is x, x represents an image, and output D(x) represents a probability that x is a real image. If a value of D(x) is 1, it indicates that the image is 100% real. If the value of D(x) is 0, it indicates that the image cannot be real. In a process of training the generative adversarial network, an objective of the generative network G is to generate an image that is as real as possible to deceive the discriminative network D, and an objective of the discriminative network D is to distinguish between the image generated by G and a real image as much as possible. In this way, a dynamic "gaming" process, to be specific, "adversary" in the "generative adversarial network", exists between G and D. A final gaming result is that in an ideal state, G may generate an image G(z) that is to be difficultly distinguished from a real image, and it is difficult for D to determine whether the image generated by G is real, to be specific, D(G(z))=0.5. In this way, an excellent generative model G is obtained, and can be used to generate an image.

The following describes a video super-resolution network (also referred to as a neural network) in detail with reference to FIG. 2a to FIG. 2e.

Figure 2A:
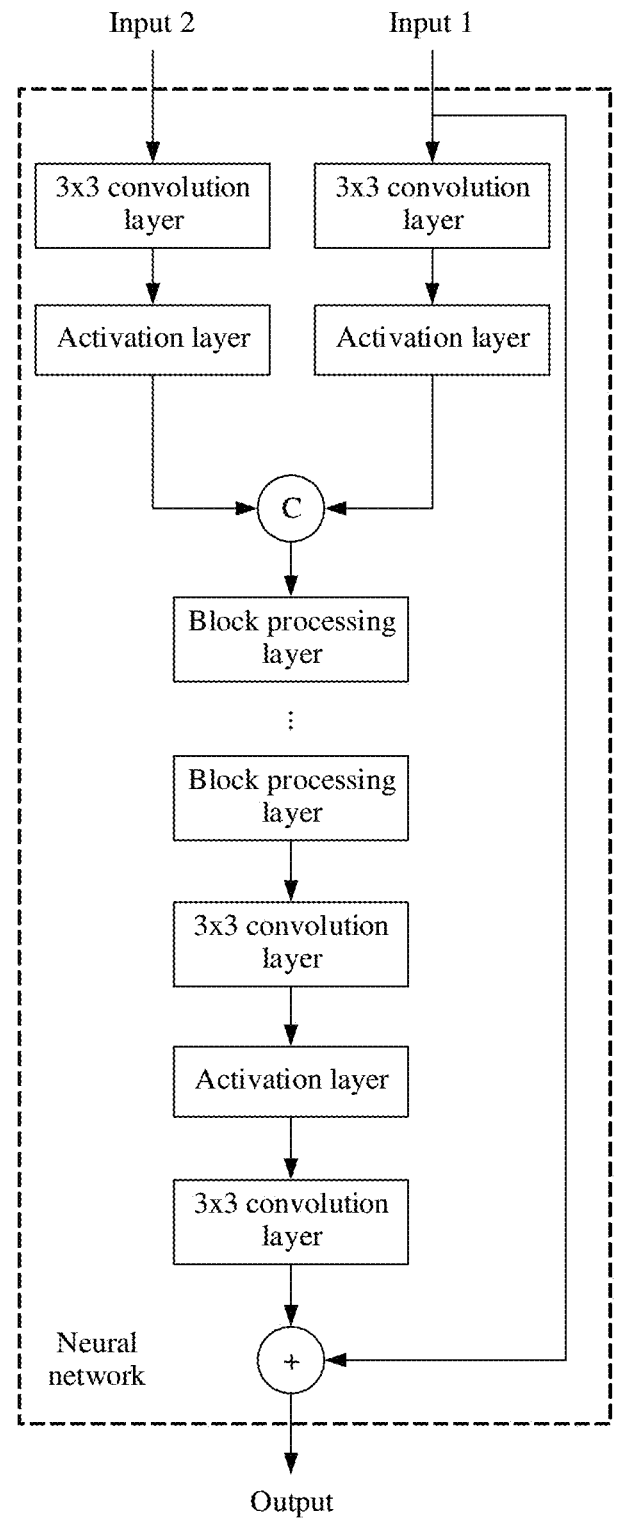
FIG. 2*a* to FIG. 2*e* show example architectures of a video super-resolution network.

As shown in FIG. 2a, input 1 is processed by a 3×3 convolution layer (3×3Conv) and an activation layer (Relu), input 2 is processed by another 3×3 convolutional layer and another activation layer, and results obtained through the foregoing processing are combined (concat). Then, a combined result is processed by a block processing layer (ResBlock), . . . , a block processing layer, a 3×3 convolutional layer, an activation layer, and a 3×3 convolutional layer to obtain a residual value. The input 1 and the residual value are added to obtain output.

Figures 2B, 2C:
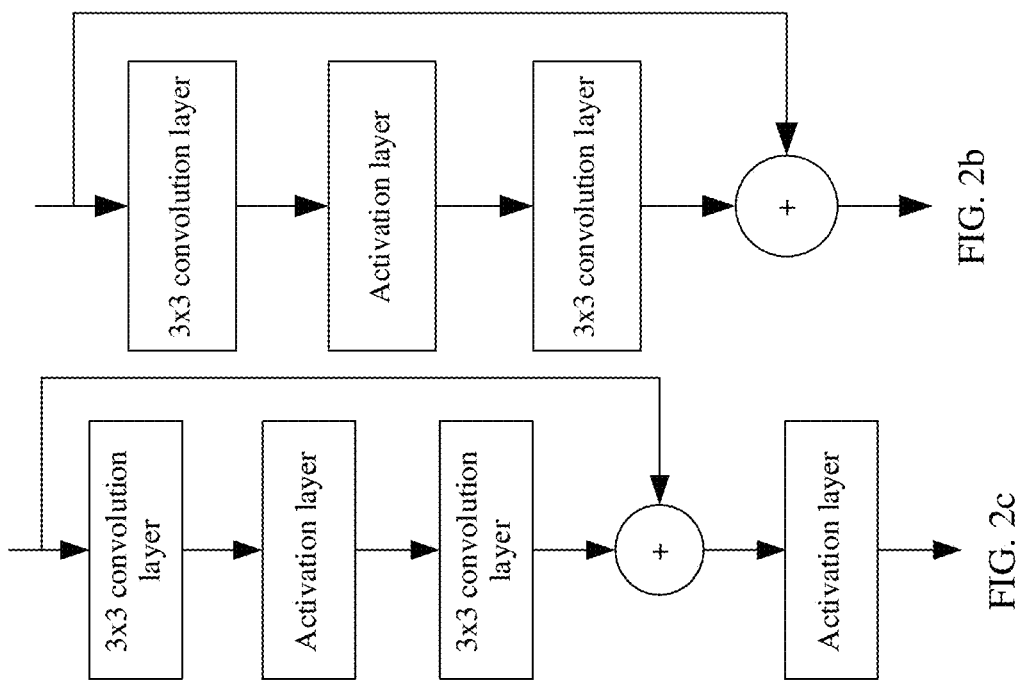

As shown in FIG. 2b, the block processing layer may include a 3×3 convolutional layer, an activation layer, and a 3×3 convolutional layer. After input is processed by the three layers, a result obtained through processing is added to initial input to obtain output.

As shown in FIG. 2c, the block processing layer may include a 3×3 convolutional layer, an activation layer, a 3×3 convolutional layer, and an activation layer. After input is processed by the 3×3 convolutional layer, the activation layer, and the 3×3 convolutional layer, a result obtained through processing is added to initial input. Finally, an added result is input to the activation layer to obtain output.

Figure 2D:
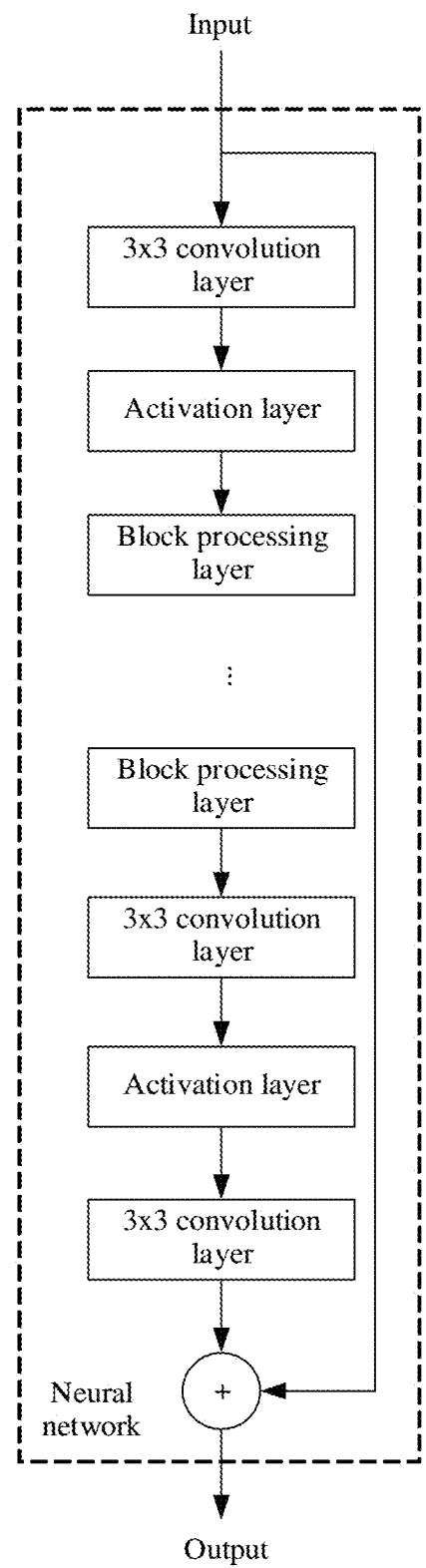

As shown in FIG. 2d, input is processed by a 3×3 convolutional layer, an activation layer, a block processing layer, . . . , a block processing layer, a 3×3 convolutional layer, an activation layer, and a 3×3 convolutional layer to obtain output.

Figure 2E:
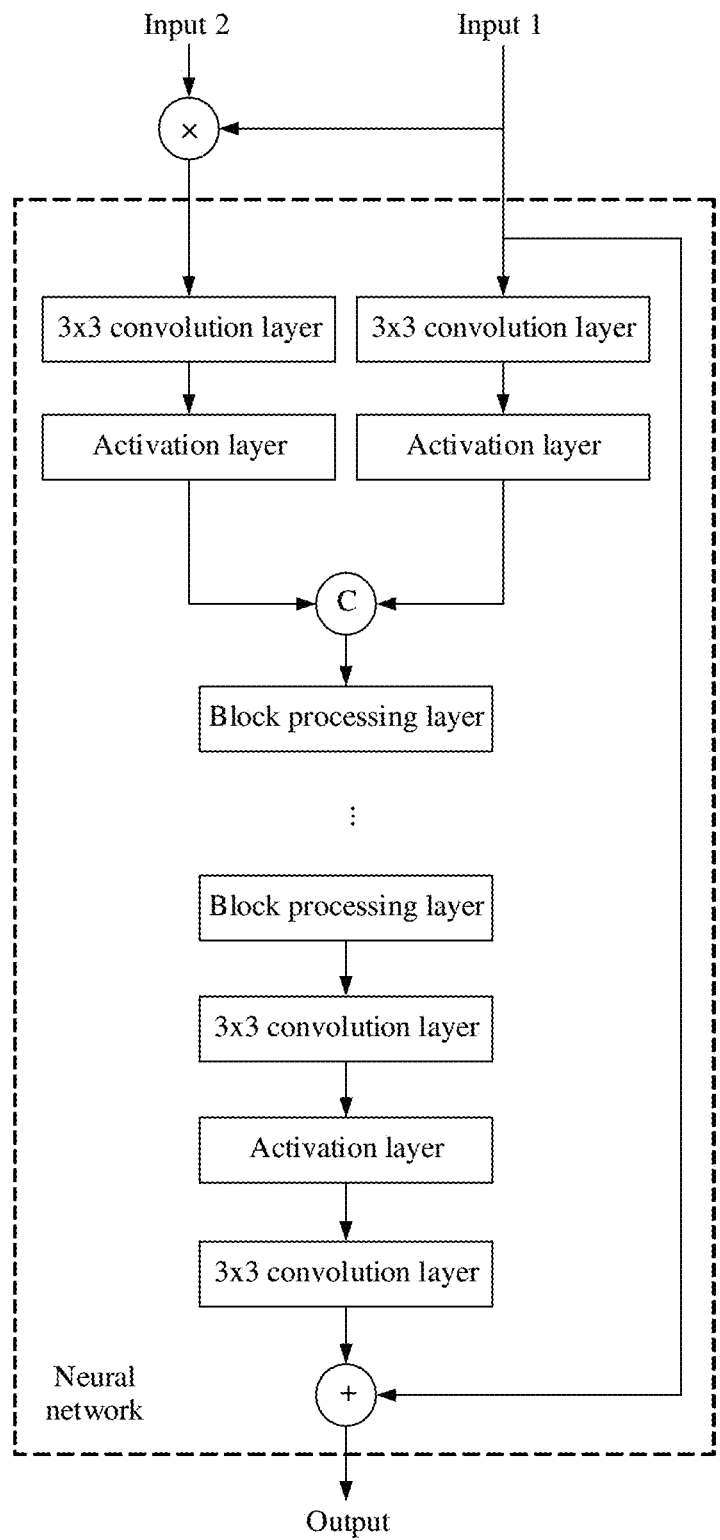

As shown in FIG. 2e, input 1 is processed by a 3×3 convolutional layer and an activation layer. The input 1 is multiplied by input 2, and a result obtained through multiplication is processed by another 3×3 convolutional layer and another activation layer. Then, results obtained through the foregoing processing are combined (concat). A combined result is input to a block processing layer, . . . , a block processing layer, a 3×3 convolutional layer, an activation layer, and a 3×3 convolutional layer to obtain a residual value. The input 1 and the residual value are added to obtain output.

It should be noted that the neural networks shown in FIG. 2a to FIG. 2e are merely used as several examples of the neural network. In a specific application, the neural network may alternatively exist in a form of another network model. This is not specifically limited in the present disclosure. In addition, input and output of the video super-resolution network depend on a training process of the video super-resolution network, and the foregoing input and output, and a quantity of input and output are not limited. The input 1 and the input 2 each may correspond to any image frame input to the video super-resolution network, and the output may correspond to a high-resolution image frame output from the video super-resolution network.

Figure 3:
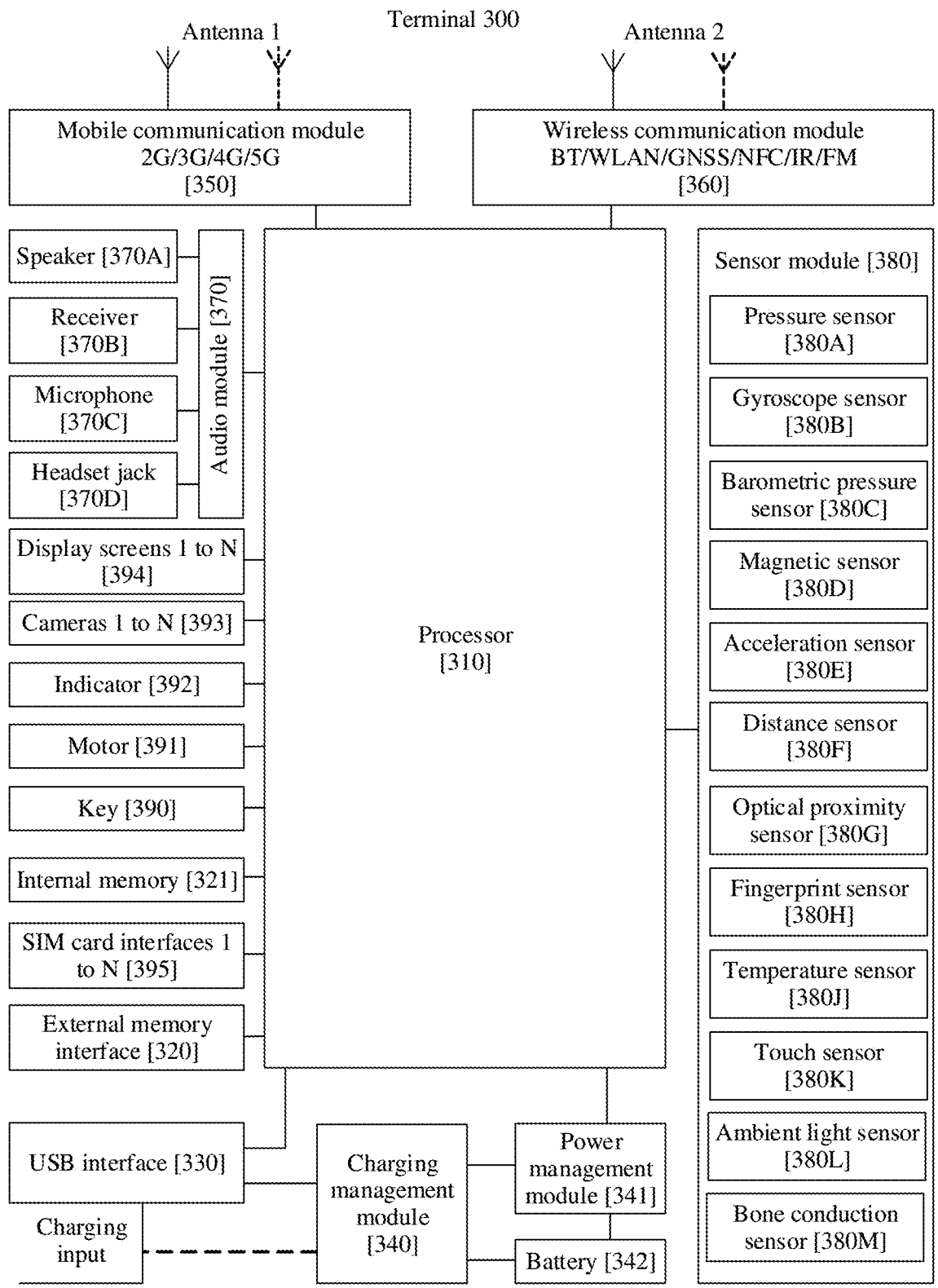
FIG. 3 is a schematic diagram of a structure of a terminal 300.

FIG. 3 is a schematic diagram of a structure of a terminal 300.

The terminal 300 may include a processor 310, an external memory interface 320, an internal memory 321, a universal serial bus (USB) interface 330, a charging management module 340, a power management module 341, a battery 432, an antenna 1, an antenna 2, a mobile communication module 350, a wireless communication module 360, an audio module 370, a speaker 370A, a receiver 370B, a microphone 370C, a headset jack 370D, a sensor module 380, a key 390, a motor 391, an indicator 392, a camera 393, a display screen 394, and a subscriber identity module (SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment of the present invention does not constitute a specific limitation on the terminal 300. In some other embodiments of the present disclosure, the terminal 300 may include more or fewer components than those shown in the figure, combine some components, split some components, or have different component arrangements. The components shown in the figure may be implemented through hardware, software, or a combination of software and hardware.

The processor 310 may include one or more processing units. For example, the processor 310 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

The memory may be disposed in the processor 310, and is configured to store instructions and data. In some embodiments, the memory in the processor 310 is a cache. The memory may store an instruction or data that has been used or cyclically used by the processor 310. If the processor 310 needs to use the instruction or the data again, the processor may directly invoke the instruction or the data from the memory. This avoids repeated access and reduces waiting time of the processor 310, thereby improving system efficiency.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 310 may include a plurality of groups of I2C buses. The processor 310 may be coupled to the touch sensor 380K, a charger, a flash, the camera 393, and the like through different I2C bus interfaces. For example, the processor 310 may be coupled to the touch sensor 380K through the I2C interface, so that the processor 310 communicates with the touch sensor 380K through the I2C bus interface to implement a touch function of the terminal 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communication module 360 through the I2S interface, to implement a function of answering a call through a Bluetooth headset.

The PCM interface may also be used to perform audio communication, and sample, quantize, and code an analog signal. In some embodiments, the audio module 370 may be coupled to the wireless communication module 360 through a PCM bus interface. In some embodiments, the audio module 370 may transmit an audio signal to the wireless communication module 360 through the PCM interface, to implement the function of answering a call through the Bluetooth headset. Both the I2S interface and the PCM interface may be used for audio communication.

The UART interface is a universal serial data bus, and is configured to perform asynchronous communication. The bus may be a bidirectional communication bus. The bus converts to-be-transmitted data between serial communication and parallel communication. In some embodiments, the UART interface is usually configured to connect the processor 310 to the wireless communication module 360. For example, the processor 310 communicates with a Bluetooth module in the wireless communication module 360 through the UART interface, to implement a Bluetooth function. In some embodiments, the audio module 370 may transmit an audio signal to the wireless communication module 360 through the UART interface, to implement a function of playing music through the Bluetooth headset.

The MIPI interface may be configured to connect the processor 310 to a peripheral component such as the display screen 394 or the camera 393. The MIPI interface includes a camera serial interface (CSI), a display serial interface (DSI), and the like. In some embodiments, the processor 310 communicates with the camera 393 through the CSI interface, to implement a photographing function of the terminal 300. The processor 310 communicates with the display screen 394 through the DSI interface, to implement a display function of the terminal 300.

The GPIO interface may be configured through software. The GPIO interface may be configured as a control signal or a data signal. In some embodiments, the GPIO interface may be configured to connect the processor 310 to the camera 393, the display screen 394, the wireless communication module 360, the audio module 370, the sensor module 380, and the like. The GPIO interface may alternatively be configured as an I2C interface, an I2S interface, a UART interface, an MIPI interface, or the like.

The USB interface 330 is an interface that conforms to a USB standard specification, and may be specifically a mini USB interface, a micro USB interface, a USB type-C interface, or the like. The USB interface 330 may be configured to connect to the charger to charge the terminal 300, or may be configured to transmit data between the terminal 300 and a peripheral device. The USB interface 130 may also be configured to connect to a headset and play audio through the headset. The interface may be further configured to connect to another terminal, for example, an AR device.

It may be understood that an interface connection relationship between the modules shown in this embodiment is merely used as an example for description, and does not constitute a limitation on the structure of the terminal 300. In some other embodiments of the present disclosure, the terminal 300 may alternatively use an interface connection manner different from that in the foregoing embodiment, or a combination of a plurality of interface connection manners.

The charging management module 340 is configured to receive charging input from the charger. The charger may be a wireless charger or a wired charger. In some wired charging embodiments, the charging management module 340 may receive charging input of the wired charger through the USB interface 330. In some wireless charging embodiments, the charging management module 340 may receive wireless charging input by using a wireless charging coil of the terminal 300. When charging the battery 432, the charging management module 340 may further supply power to the terminal by using the power management module 341.

The power management module 341 is configured to connect the battery 432, the charging management module 340, and the processor 310. The power management module 341 receives input of the battery 432 and/or the charging management module 340, to supply power to the processor 310, the internal memory 321, the display screen 394, the camera 393, the wireless communication module 360, and the like. The power management module 341 may further be configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same component.

A wireless communication function of the terminal 300 may be implemented by using the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the terminal 300 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 350 may provide a wireless communication solution that includes 2G/3G/4G/5G or the like and that is applied to the terminal 300. The mobile communication module 350 may include at least one filter, a switch, a power amplifier, a low noise amplifier (LNA), and the like. The mobile communication module 350 may receive an electromagnetic wave through the antenna 1, perform processing such as filtering or amplification on the received electromagnetic wave, and transmit an electromagnetic wave obtained through processing to the modem processor for demodulation. The mobile communication module 350 may further amplify a signal modulated by the modem processor, and convert the signal into an electromagnetic wave for radiation through the antenna 1. In some embodiments, at least some function modules of the mobile communication module 350 may be disposed in the processor 310. In some embodiments, the at least some function modules of the mobile communication module 350 and at least some modules of the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 370A, the receiver 370B, or the like), or displays an image or a video on the display screen 394. In some embodiments, the modem processor may be an independent component. In some other embodiments, the modem processor may be independent of the processor 310, and is disposed in a same device as the mobile communication module 350 or another functional module.

The wireless communication module 360 may provide a wireless communication solution that is applied to the terminal 300 and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 360 may be one or more components integrating at least one communication processing module. The wireless communication module 360 receives an electromagnetic wave through the antenna 2, performs frequency modulation and filtering processing on an electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 and the mobile communication module 350 of the terminal 300 are coupled, and the antenna 2 and the wireless communication module 360 of the terminal 300 are coupled, so that the terminal 300 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The terminal 300 implements a display function by using the GPU, the display screen 394, the application processor, and the like. The GPU is a microprocessor used for image processing, and is connected to the display screen 394 and the application processor. The GPU is configured to perform mathematical and geometric calculation, and is configured to perform graphics rendering. The processor 310 may include one or more GPUs, which execute program instructions to generate or change display information.

The display screen 394 is configured to display an image, a video, and the like. The display screen 394 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal 300 may include one or N display screens 394, where N is a positive integer greater than 1.

The terminal 300 may implement a photographing function by using the ISP, the camera 393, the video codec, the GPU, the display screen 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens and projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 300 may include one or N cameras 393, where N is a positive integer greater than 1.

The digital signal processor is configured to process a digital signal, and may process another digital signal in addition to the digital image signal. For example, when the terminal 300 selects a frequency, the digital signal processor is configured to perform Fourier transformation on frequency energy. In the present disclosure, the terminal may obtain M image frames based on super-resolution reference information, and input the M image frames and a to-be-processed first image frame into a video super-resolution network, to perform super-resolution processing on the first image frame. After obtaining a quantization parameter from the super-resolution reference information, the terminal may obtain, based on the quantization parameter, a video super-resolution network corresponding to the quantization parameter. Super-resolution is a process of obtaining a high-resolution image frame by using a plurality of low-resolution image frames. Higher resolution indicates more pixels included per inch. Super-resolution processing is to increase a quantity of pixels included per inch, so that details of an image frame become rich, and definition of the image frame is improved. The terminal selects, based on the super-resolution reference information from a transmit end, the to-be-used video super-resolution network, and selects a reference image frame used in super-resolution processing, to perform super-resolution processing on the first image frame (namely, a to-be-super-resolution processed image frame), and improve resolution of the first image frame. On one hand, the terminal selects the corresponding video super-resolution network based on the quantization parameter of the first image frame, so that the resolution can be better improved. On the other hand, the reference image frame is selected by using a score evaluated by the transmit end for each image frame, to maximize quality after multi-frame fusion and super-resolution are performed, and improve effect of super-resolution processing on the image frame. On the third hand, a resource of the transmit end is used to score an image frame in a video stream, so that a processing resource of the terminal can be saved, a computation amount of the terminal can be reduced, and super-resolution processing efficiency of the terminal can be improved.

The video codec is configured to compress or decompress a digital video. The terminal 300 may support one or more video codecs. In this way, the terminal 300 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information based on a structure of a biological neural network, for example, based on a transfer mode between human brain neurons; and may further continuously perform self-learning. Applications such as intelligent cognition of the terminal 300, such as image recognition, facial recognition, speech recognition, and text understanding, can be implemented by using the NPU.

The external memory interface 320 may be configured to connect to an external storage card, for example, a micro SD card, to extend a storage capability of the terminal 300. The external storage card communicates with the processor 310 through the external memory interface 320, to implement a data storage function. For example, files such as music and videos are stored in the external storage card.

The internal memory 321 may be configured to store computer-executable program code, where the executable program code includes instructions. The internal memory 321 may include a program storage area and a data storage area. The program storage area may store an operating system, an application (for example, a sound playing function or an image playing function) required by at least one function, and the like. The data storage area may store data (for example, audio data and an address book) and the like created when the terminal 300 is used. In addition, the internal memory 321 may include a high-speed random access memory, and may further include a nonvolatile memory, for example, at least one magnetic disk storage device, a flash memory device, or a universal flash storage (UFS). The processor 310 runs the instructions stored in the internal memory 321 and/or instructions stored in the memory disposed in the processor, to perform various function applications of the terminal 300 and data processing.

The terminal 300 may implement an audio function by using the audio module 370, the speaker 370A, the receiver 370B, the microphone 370C, the headset jack 370D, the application processor, and the like. For example, the audio function includes music playing, recording, and the like.

The audio module 370 is configured to convert digital audio information into an analog audio signal for output, and is also configured to convert analog audio input into a digital audio signal. The audio module 370 may be further configured to encode and decode audio signals. In some embodiments, the audio module 370 may be disposed in the processor 310, or some functional modules in the audio module 370 are disposed in the processor 310.

The speaker 370A, also referred to as a "loudspeaker", is configured to convert an audio electrical signal into a sound signal. The terminal 300 may be used to listen to music or answer a call in a hands-free mode over the speaker 370A.

The receiver 370B, also referred to as an "earpiece", is configured to convert an audio electrical signal into a sound signal. When a call is answered or voice information is received by using the terminal 300, the receiver 370B may be put close to a human ear to listen to a voice.

The microphone 370C, also referred to as a "mike" or a "mic", is configured to convert a sound signal into an electrical signal. When making a call or sending voice information, a user may make a sound near the microphone 370C through the mouth of the user, to input a sound signal to the microphone 370C. At least one microphone 370C may be disposed in the terminal 300. In some other embodiments, two microphones 370C may be disposed in the terminal 300, to collect a sound signal and further implement a noise reduction function. In some other embodiments, three, four, or more microphones 370C may alternatively be disposed in the terminal 300, to collect a sound signal, implement noise reduction, and identify a sound source, so as to implement a directional recording function and the like.

The headset jack 370D is configured to connect to a wired headset. The headset jack 370D may be the USB interface 330, or may be a 3.5 mm open mobile terminal platform (OMTP) standard interface, or a cellular telecommunication industry association of the USA (CTIA) standard interface.

The pressure sensor 380A is configured to sense a pressure signal, and can convert the pressure signal into an electrical signal. In some embodiments, the pressure sensor 380A may be disposed on the display screen 394. There is a plurality of types of pressure sensors 380A, such as a resistive pressure sensor, an inductive pressure sensor, and a capacitive pressure sensor. The capacitive pressure sensor may include at least two parallel plates made of conductive materials. When force is applied to the pressure sensor 380A, a capacitance between electrodes changes. The terminal 300 determines pressure strength based on a capacitance change. When a touch operation is performed on the display screen 394, the terminal 300 detects intensity of the touch operation based on the pressure sensor 380A. The terminal 300 may also calculate a touch location based on a detection signal of the pressure sensor 380A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 380B may be configured to determine a motion posture of the terminal 300. In some embodiments, an angular velocity of the terminal 300 around three axes (namely, axes x,y, and z) may be determined by using the gyroscope sensor 380B. The gyroscope sensor 380B may be configured to perform image stabilization during photographing. For example, when the shutter is pressed, the gyroscope sensor 380B detects an angle at which the terminal 300 jitters, obtains, through calculation based on the angle, a distance for which a lens module needs to compensate, and allows a lens to cancel the jitter of the terminal 300 through reverse motion, to implement image stabilization. The gyroscope sensor 380B may also be used in a navigation scenario and a somatic game scenario.

The barometric pressure sensor 380C is configured to measure barometric pressure. In some embodiments, the terminal 300 calculates an altitude by using a barometric pressure value measured by the barometric pressure sensor 380C, to assist positioning and navigation.

The magnetic sensor 380D includes a Hall effect sensor. The terminal 300 may detect opening and closing of a flip leather case by using the magnetic sensor 380D. In some embodiments, when the terminal 300 is a clamshell phone, the terminal 300 may detect opening and closing of a flip cover based on the magnetic sensor 380D. Further, a feature such as automatic unlocking of the flip cover is set based on a detected opening or closing state of the leather case or a detected opening or closing state of the flip cover.

The acceleration sensor 380E may detect values of accelerations in various directions (usually on three axes) of the terminal 300, and may detect magnitude and a direction of gravity when the terminal 300 is still. The acceleration sensor 380E may be further configured to identify a posture of the terminal, and is applied to an application such as switching between a landscape mode and a portrait mode or a pedometer.

The distance sensor 380F is configured to measure a distance. The terminal 300 may measure a distance by using infrared or laser. In some embodiments, in a photographing scenario, the terminal 300 may measure a distance by using the distance sensor 380F to implement quick focusing.

The optical proximity sensor 380G may include, for example, a light-emitting diode (LED) and an optical detector such as a photodiode. The light-emitting diode may be an infrared light-emitting diode. The terminal 300 emits infrared light to the outside by using the light-emitting diode. The terminal 300 detects infrared reflected light from a nearby object by using the photodiode. When sufficient reflected light is detected, it may be determined that there is an object near the terminal 300. When insufficient reflected light is detected, the terminal 300 may determine that there is no object near the terminal 300. The terminal 300 may detect, by using the optical proximity sensor 380G, that the user holds the terminal 300 close to an ear to make a call, to automatically turn off a screen for power saving. The optical proximity sensor 380G may also be used in a leather case mode or a pocket mode to automatically unlock or lock a screen.

The ambient light sensor 380L is used to sense ambient light brightness. The terminal 300 may adaptively adjust brightness of the display screen 394 based on the sensed ambient light brightness. The ambient light sensor 380L may also be configured to automatically adjust white balance during photographing. The ambient light sensor 380L may also cooperate with the optical proximity sensor 380G to detect whether the terminal 300 is in a pocket, to avoid an accidental touch.

The fingerprint sensor 380H is configured to collect a fingerprint. The terminal 300 may use a feature of the collected fingerprint to implement fingerprint-based unlocking, application lock access, fingerprint-based photographing, fingerprint-based call answering, and the like.

The temperature sensor 380J is configured to detect a temperature. In some embodiments, the terminal 300 executes a temperature processing policy based on the temperature detected by the temperature sensor 380J. For example, when the temperature reported by the temperature sensor 380J exceeds a threshold, the terminal 300 lowers performance of a processor near the temperature sensor 380J, to reduce power consumption for thermal protection. In some other embodiments, when the temperature is less than another threshold, the terminal 300 heats the battery 432 to prevent the terminal 300 from being shut down abnormally due to a low temperature. In some other embodiments, when the temperature is less than still another threshold, the terminal 300 boosts an output voltage of the battery 432 to prevent the terminal 300 from being shut down abnormally due to a low temperature.

The touch sensor 380K is also referred to as a "touch component". The touch sensor 380K may be disposed on the display screen 394, and the touch sensor 380K and the display screen 394 form a touchscreen, which is also referred to as a "touch screen". The touch sensor 380K is configured to detect a touch operation performed on or near the touch sensor. The touch sensor may transfer the detected touch operation to the application processor to determine a touch event type. Visual output related to the touch operation may be provided by using the display screen 394. In some other embodiments, the touch sensor 380K may alternatively be disposed on a surface of the terminal 300 at a location different from that of the display screen 394.

The bone conduction sensor 380M may obtain a vibration signal. In some embodiments, the bone conduction sensor 380M may obtain a vibration signal of a vibration bone of a human vocal-cord part. The bone conduction sensor 380M may also come into contact with a pulse of a human body and receive a blood pressure pulse signal. In some embodiments, the bone conduction sensor 380M may also be disposed in a headset, to obtain a bone conduction headset. The audio module 370 may obtain a speech signal through parsing based on the vibration signal that is of the vibration bone of the vocal-cord part and that is obtained by the bone conduction sensor 380M, to implement a speech function. The application processor may parse heart rate information based on the blood pressure pulse signal obtained by the bone conduction sensor 380M, to implement a heart rate detection function.

The key 390 includes a power-on key, a volume key, and the like. The key 390 may be a mechanical key, and may be a touch key. The terminal 300 may receive key input, and generate key signal input related to user setting and function control of the terminal 300.

The motor 391 may generate a vibration prompt. The motor 391 may be configured to provide an incoming call vibration prompt and touch vibration feedback. For example, touch operations performed on different applications (for example, photographing and audio playing) may correspond to different vibration feedback effect. The motor 391 may also correspond to different vibration feedback effect for touch operations performed on different areas of the display screen 394. Different application scenarios (for example, a time reminder, information receiving, an alarm clock, and a game) may also correspond to different vibration feedback effect. The touch vibration feedback effect may be further customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or plugged from the SIM card interface 395, to implement contact with or separation from the terminal 300. The terminal 300 may support one or N SIM card interfaces, where N is a positive integer greater than 1. The SIM card interface 395 can support a nano-SIM card, a micro-SIM card, a SIM card, and the like. A plurality of cards may be simultaneously inserted into a same SIM card interface 395. The plurality of cards may be of a same type or different types. The SIM card interface 395 may be compatible with different types of SIM cards. The SIM card interface 395 is also compatible with an external storage card. The terminal 300 interacts with a network by using the SIM card, to implement functions such as calling and data communication. In some embodiments, the terminal 300 uses an eSIM, namely, an embedded SIM card. The eSIM card may be embedded in the terminal 300, and cannot be separated from the terminal 300.

Figure 4:
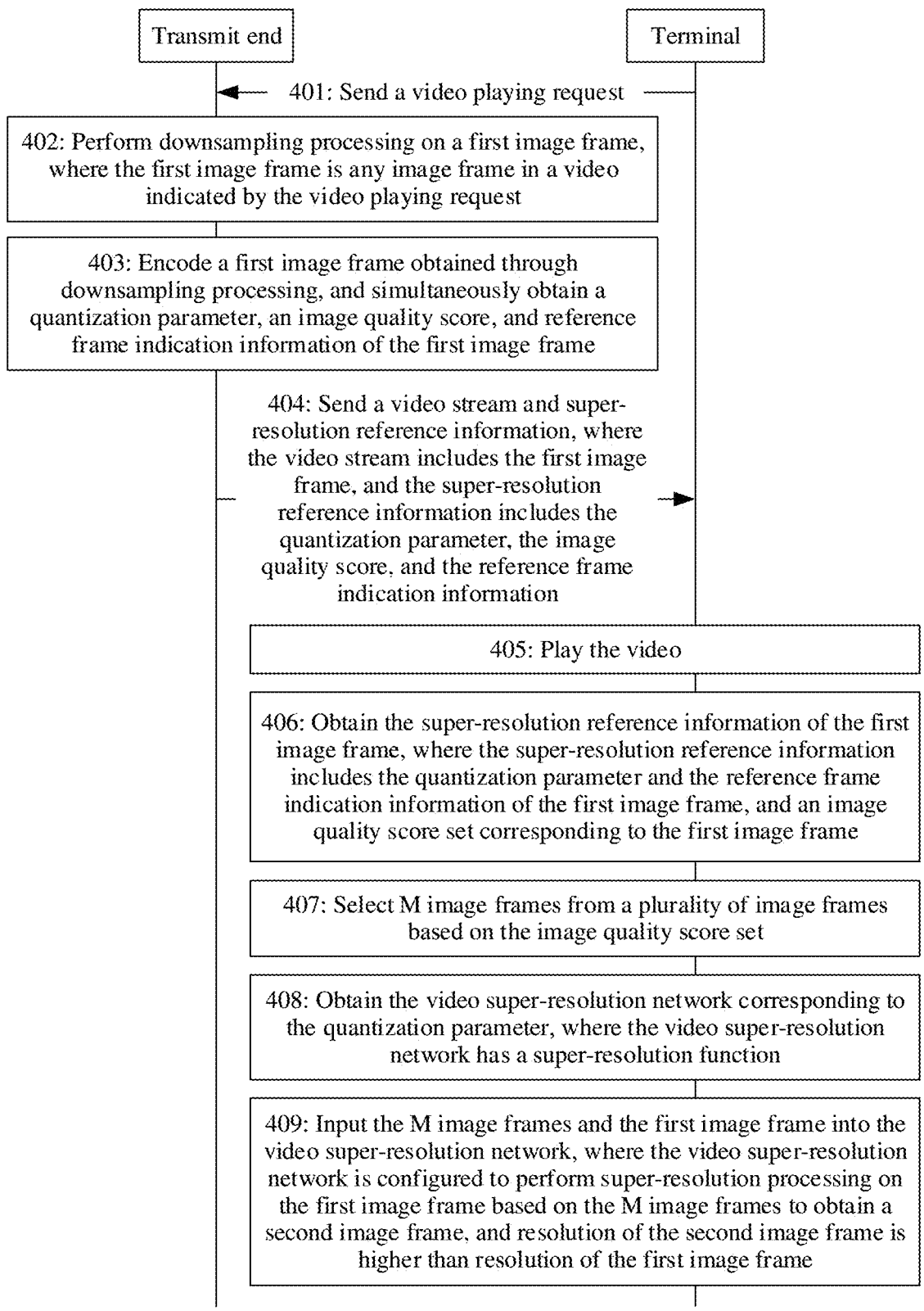
FIG. 4 is a flowchart of an embodiment of an image frame super-resolution implementation method according to the present disclosure.

FIG. 4 is a flowchart of an embodiment of an image frame super-resolution implementation method according to the present disclosure. As shown in FIG. 4, the method in this embodiment may be applied to the architecture shown in FIG. 1, and may be executed by the transmit end and the terminal shown in FIG. 2. The image frame super-resolution implementation method may include the following steps.

Step 401: A terminal sends a video playing request to a transmit end.

Based on an application scenario of the method provided in the present disclosure, a user plays a video online on the terminal. After the user selects the to-be-played video, for example, clicks a thumbnail or a name of the video, the terminal obtains an instruction triggered by the operation. Then, the terminal sends the video playing request to the transmit end of the video based on the instruction.

For example, the user plays the video by using a video application (APP) installed on the terminal. After starting the video APP, the user browses a video list in the video APP, and clicks the corresponding video to trigger playing of the video on the terminal. An operation of the user triggers the video APP to generate the video playing request. The video playing request carries identification information of the to-be-played video, for example, a uniform resource locator (URL) or a video index. The terminal sends, by using a communication network between the terminal and the transmit end, the video playing request to the transmit end that stores the to-be-played video.

Step 402: The transmit end performs downsampling processing on a first image frame, where the first image frame is any image frame in the video indicated by the video playing request.

After receiving the video playing request from the terminal, the transmit end extracts the corresponding video from a video library based on the identification information carried in the video playing request. To reduce a bit rate of video transmission, the transmit end may separately perform downsampling processing on each image frame included in the video to reduce image data. A downsampling method may include nearest neighbor interpolation, bilinear interpolation, bicubic interpolation, and the like. A scale of downsampling may be one half, one quarter, or the like. It should be noted that a specific downsampling method, a parameter, or the like used by the transmit end is not specifically limited in the present disclosure.

Step 403: The transmit end encodes a first image frame obtained through downsampling processing, and simultaneously obtains a quantization parameter, an image quality score, and reference frame indication information of the first image frame.

An encoding module of the transmit end encodes the first image frame obtained through downsampling processing, to obtain a bitstream of the first image frame. An encoding process includes mode selection, quantization processing, and reconstruction. In a mode selection process, the transmit end may determine a reference frame of the first image frame, and further obtain the reference frame indication information. In a quantization processing process, the transmit end may obtain the quantization parameter. In a reconstruction process, the transmit end may obtain the image quality score of the first image frame based on the original first image frame and a reconstructed frame of the first image frame.

The transmit end may perform quality scoring based on the first image frame and the reconstructed frame of the first image frame, to obtain the image quality score of the first image frame. The transmit end may obtain the image quality score by using a scoring tool such as a PSNR, SSIM, or VMAF.

Step 404: The transmit end sends a video stream and super-resolution reference information to the terminal, where the video stream includes the first image frame, and the super-resolution reference information includes the quantization parameter, the image quality score, and the reference frame indication information.

After encoding the video stream, the transmit end obtains a bitstream of the video stream. In one case, during encoding, the transmit end encodes both data of an image frame and the super-resolution reference information in the video stream, for example, the quantization parameter, the image quality score, and the reference frame indication information, to obtain a bitstream including the data of the image frame and the super-resolution reference information; and transmits the bitstream to the terminal. In another case, the transmit end encodes the data of the image frame in the video stream to obtain a bitstream of the image frame, encodes the super-resolution reference information to obtain a bitstream of the super-resolution reference information, splices the bitstream of the image frame and the bitstream of the super-resolution reference information, and transmits a spliced bitstream to the terminal. An implementation of the bitstream is not specifically limited in the present disclosure.

Step 405: The terminal plays the video.

After the terminal receives the bitstream from the transmit end, a decoding apparatus in the terminal decodes the bitstream to obtain the image frames and the super-resolution reference information in the video stream, and plays the image frames frame by frame on the video APP based on a time sequence of the image frames. The bitstream of the image frame carries timestamp information of the image frame, for example, a time point of the image frame in the video stream, a sequence number of the image frame in the video stream, or an offset between the image frame and the first image frame in the video stream.

Step 406: The terminal obtains the super-resolution reference information of the first image frame, where the super-resolution reference information includes the quantization parameter and the reference frame indication information of the first image frame, and an image quality score set corresponding to the first image frame.

In a video playing process, the user may be unsatisfied with current resolution of the played video, and expects to see a clearer image. In this case, the user may tap a control provided on the video APP (for an implementation process, refer to the following embodiment, and details are not described herein again) to select higher resolution or highest resolution. This operation triggers generation of a resolution change instruction, where the instruction includes the resolution selected by the user, and the resolution selected by the user is higher than the current resolution. Based on the resolution change instruction, the terminal starts to perform super-resolution processing on the image frame in the video stream.

Optionally, in the video playing process of the video APP, it is detected that the received video stream can support online playing with higher resolutions. Therefore, super-resolution processing is actively triggered on the image frame in the video stream.

The quantization parameter and the reference frame indication information of the first image frame may be directly obtained from the bitstream of the first image frame; and the image quality score set corresponding to the first image frame may be obtained, based on a preset range, from bitstreams that of a plurality of image frames within the range and that include the first image frame.

To perform super-resolution processing on the first image frame, a super-resolution video network needs to input a plurality of frames of images for reference. Therefore, the terminal may first obtain the image quality score set based on the preset range, where the image quality score set may include image quality scores of N consecutive image frames in a time sequence in the video stream, and the N image frames include the first image frame. It is assumed that a sequence number of the first image frame in the video sequence is n, and a sequence number range of the N image frames is [1, N], where 1≤n≤N. For example, N=3, and the N image frames may include n−1, n, and n+1. For another example, N=4, and the N image frames may include n−2, n−1, n, and n+1. For still another example, N=8, and the N image frames may include n−3, n−2, n−1, n, n+1, n+2, n+3 and n+4. A value of N does not need to be excessively large. If the value of N is excessively large, a content span of the N image frames may be excessively large. Consequently, super-resolution processing effect on the first image frame is poor. It should be noted that the first image frame may be located in the middle of the N image frames, or may be located at a front end or a back end of a sequence of the N image frames. Specific selection may be determined according to a preset selection rule. This is not specifically limited in the present disclosure.

Step 407: The terminal selects M image frames from the plurality of image frames based on the image quality score set.

A value of M is related to a training model of the super-resolution video network. For example, when a training engine of the transmit end trains the super-resolution video network, input training data includes the M image frames. In this case, the M image frames also need to be input when the super-resolution video network is used, where M>1.

The terminal may select, from the N image frames, M image frames with highest image quality scores. It can be learned that the M image frames selected by the terminal may or may not be consecutive M image frames in a time sequence. For example, N=3, M=2, the two selected image frames include n−1 and n+1, and the two image frames and first image frame are consecutive in sequence. For another example, N=4, M=3, the selected three image frames may include n−2, n−1, and n+1, and the three image frames and the first image frame are consecutive in sequence. For still another example, N=8, M=4, the selected four image frames may include n−3, n−1, n+2, and n+4, and the four image frames and the first image frame are inconsecutive.

It should be noted that, to ensure the effect of super-resolution processing on the first image frame and actually improve the resolution of the first image frame, in addition to the foregoing condition of selecting the M image frames with the highest image quality scores from the N image frames, it further needs to be satisfied that image quality scores of the M image frames each are higher than the image quality score of the first image frame. Therefore, there are three possibilities:

(1) When the N image frames include a first image frame set (image quality scores of image frames included in the first image frame set each are higher than the image quality score of the first image frame), and a quantity of image frames in the first image frame set is greater than or equal to M, the M image frames with the highest image quality scores are selected from the first image frame set.

In this case, it indicates that there are sufficient image frames whose image quality scores are higher than the image quality score of the first image frame in the N image frames. Therefore, the M image frames may be directly selected from the first image frame set.

(2) The N image frames include the first image frame set, but the quantity of image frames in the first image frame set is less than M. All image frames are selected from the first image frame set, and the image quality scores of the image frames included in the first image frame set each are higher than the image quality score of the first image frame. When a quantity of all the image frames is less than M, image frames corresponding to the reference frame indication information are selected from the plurality of image frames. When a sum of the quantity of all the image frames and a quantity of image frames corresponding to the reference frame indication information is less than M, at least one image frame whose time intervals between the at least one image frame and the first image frame are in ascending order are selected from image frames other than all the image frames and the image frames corresponding to the reference frame indication information in the plurality of image frames until the M image frames are selected.

In this case, it indicates that there are image frames whose image quality scores are higher than the image quality score of the first image frame in the N image frames, but a quantity of image frames is not sufficient. Therefore, in addition to all the image frames in the first image frame set, image frames that meet other conditions further need to be selected until a quantity of selected image frames reaches M. In other conditions, a reference frame of the first image frame is preferred. The reference frame is a reference frame used by the transmit end in a video prediction process, and may be obtained based on the reference frame indication information carried in the bitstream. It should be noted that the reference frame of the first image frame may have been included in the first image frame set. In this case, a secondary selection condition in the other conditions needs to be considered. If the M image frames are still not reached after the reference frame of the first image frame is selected, the secondary selection condition in the other conditions may be considered until the quantity of selected image frames reaches M. The secondary selection condition may be the at least one image frame, in image frames other than all the image frames in the first image frame set and the image frames corresponding to the reference frame indication information in the N image frames, whose time intervals between the at least one image frame and the first image frame are in ascending order.

(3) If the N image frames do not include the first image frame set, it is determined whether the first image frame is an I frame. If the first image frame is the I frame, the M image frames mean M replicated samples of the first image frame. If the first image frame is not the I frame, the image frames corresponding to the reference frame indication information are selected from the plurality of image frames. When the quantity of image frames corresponding to the reference frame indication information is less than M, the at least one image frame whose time intervals between the at least one image frame and the first image frame are in ascending order are selected from image frames other than the image frames corresponding to the reference frame indication information in the plurality of image frames until the M image frames are selected.

In this case, it indicates that no image frame whose image quality score is higher than the image quality score of the first image frame in the N image frames. The first image frame may have two cases. One case is that the first image frame is the I frame, and scene switching may occur starting from the first image frame. In this case, content of a previous scene is different from that of a scene after switching, and information of an image frame before the first image frame cannot be used. Alternatively, if the first image frame is an I frame inserted at a fixed interval, quality of the first image frame is usually much higher than quality of a previous image frame and a next image frame. In this way, information of the previous image frame and the next image frame cannot be used. Therefore, the selected M image frames are the M replicated samples of the first image frame. The other case is that the first image frame is not the I frame (a B frame or a P frame), and there is no optional image frame in the N image frames based on the image quality score. Therefore, the reference frame of the first image frame is first selected, and then the at least one image frame whose time intervals between the at least one image frame and the first image frame are in ascending order are selected from the image frames other than all the image frames in the first image frame set and the image frames corresponding to the reference frame indication information in the N image frames until the quantity of selected image frames reaches M.

Step 408: The terminal obtains the video super-resolution network corresponding to the quantization parameter, where the video super-resolution network has a super-resolution function.

The video super-resolution network is a neural network that has a super-resolution function and that is obtained through training. For a training process of the video super-resolution network, refer to related descriptions of the training engine at the transmit end. Details are not described herein again. As described above, in a correspondence between the super-resolution video network and a QP, after obtaining a QP of the first image frame from the bitstream, the terminal may obtain the corresponding super-resolution video network based on the QP, and use the super-resolution video network as a neural network for performing super-resolution processing on the first image frame.

Step 409: The terminal inputs the M image frames and the first image frame into the video super-resolution network, where the video super-resolution network is configured to perform super-resolution processing on the first image frame based on the M image frames to obtain a second image frame, and resolution of the second image frame is higher than resolution of the first image frame.

The terminal inputs the M image frames obtained in step 407 into the video super-resolution network, and obtains the second image frame after the M image frames are processed by the video super-resolution network. The resolution of the second image frame is resolution indicated by the resolution change instruction in step 406.

In the present disclosure, the terminal selects, based on the super-resolution reference information from the transmit end, the to-be-used video super-resolution network, and selects the reference image frame used in super-resolution processing, to perform super-resolution processing on the first image frame (namely, the to-be-super-resolution processed image frame), and improve the resolution of the first image frame. On one hand, the terminal selects the corresponding video super-resolution network based on the quantization parameter of the first image frame, so that the resolution can be better improved. On the other hand, the reference image frame is selected by using a score evaluated by the transmit end for each image frame, to maximize quality after multi-frame fusion and super-resolution are performed, and improve effect of super-resolution processing on the image frame. On the third hand, a resource of the transmit end is used to score the image frame in the video stream, so that a processing resource of the terminal can be saved, a computation amount of the terminal can be reduced, and super-resolution processing efficiency of the terminal can be improved.

Figure 5A:
FIG. 5*a* to FIG. 5*c* are example schematic diagrams of an online video playing process.
Figure 5B:
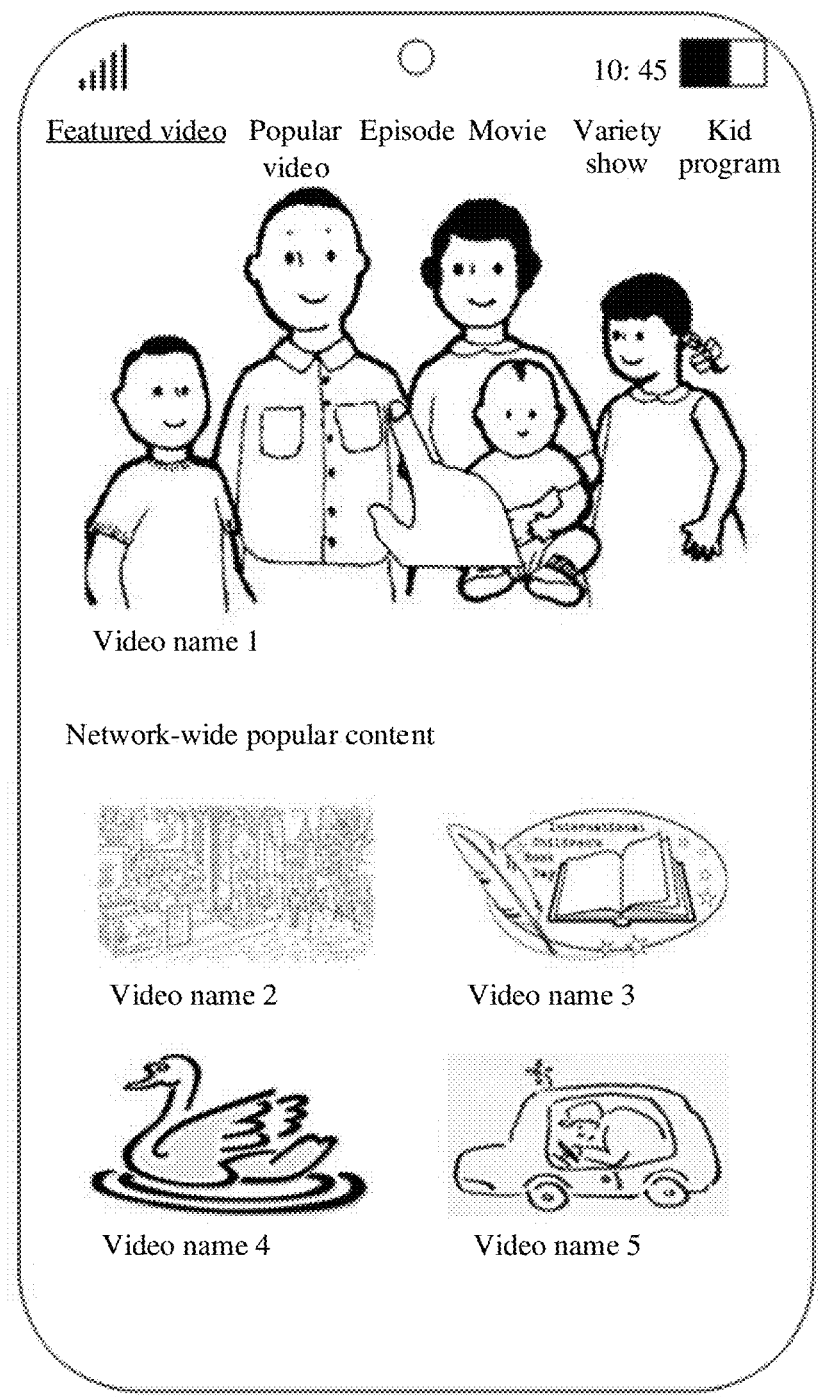
Figure 5C:
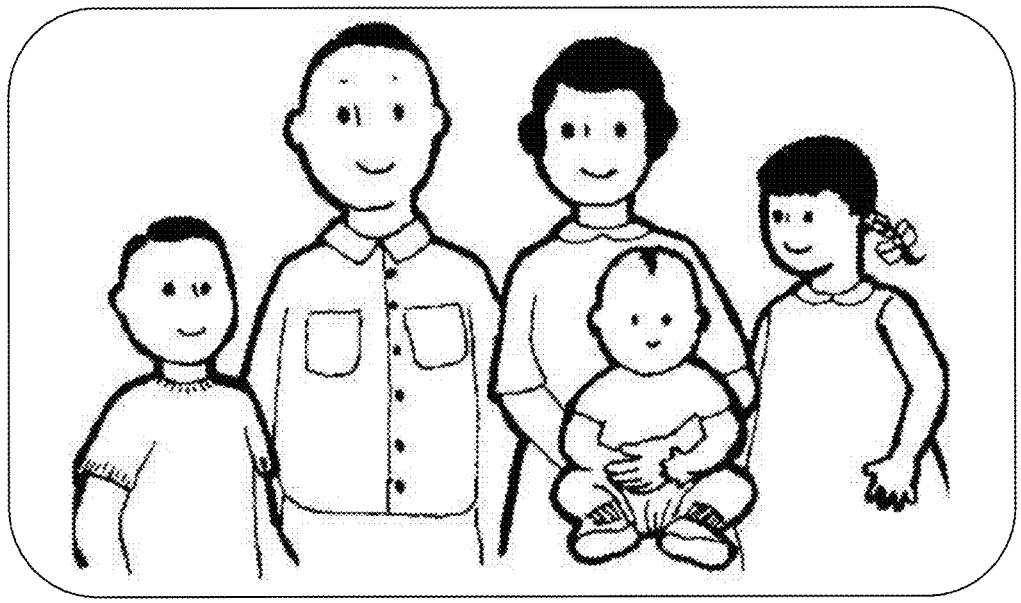

FIG. 5a to FIG. 5c are example schematic diagrams of an online video playing process.

As shown in FIG. 5a, a user taps an icon of a video APP on a desktop of a terminal to start the video APP.

As shown in FIG. 5b, the user selects a to-be-played video from a video list. The video list includes thumbnails and names of featured videos, thumbnails and names of popular videos, and titles of video categories.

As shown in FIG. 5c, a playing interface of the video selected by the user is entered, and the video starts to be played in full screen on a screen of the terminal.

Figure 6A:
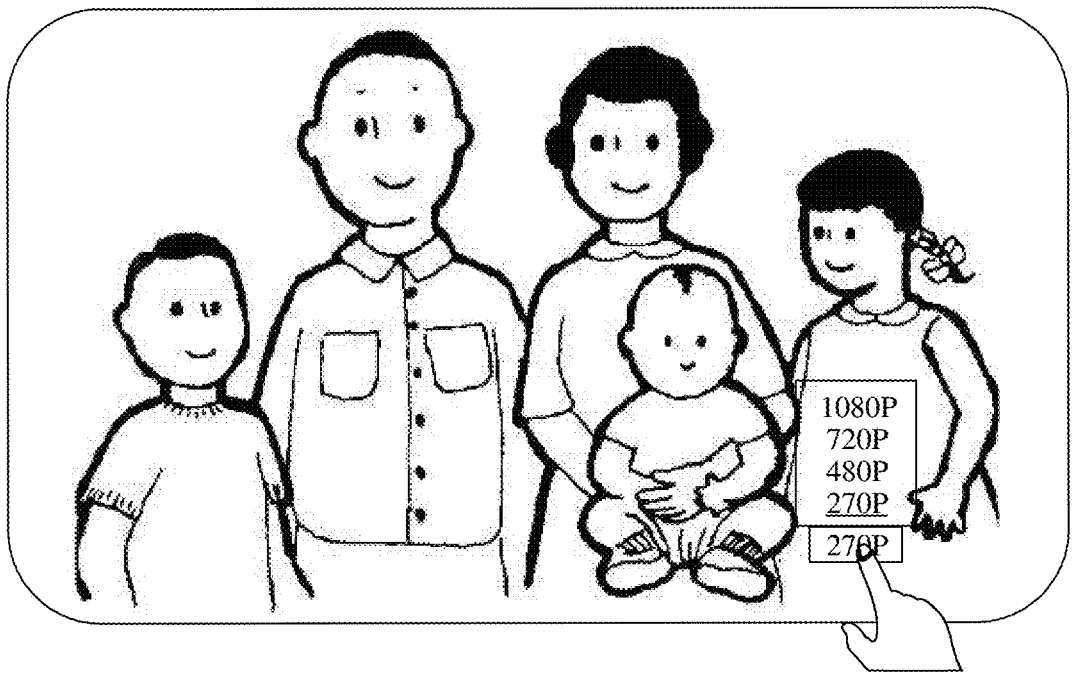
FIG. 6*a* to FIG. 6*c* are example schematic diagrams of a video resolution switching process.
Figure 6B:
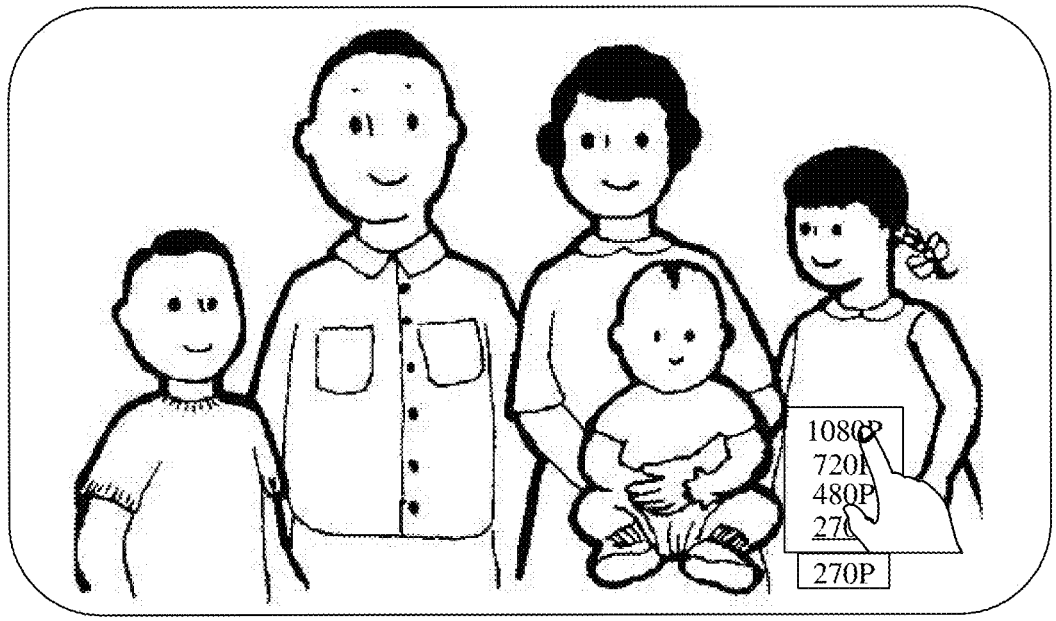
Figure 6C:
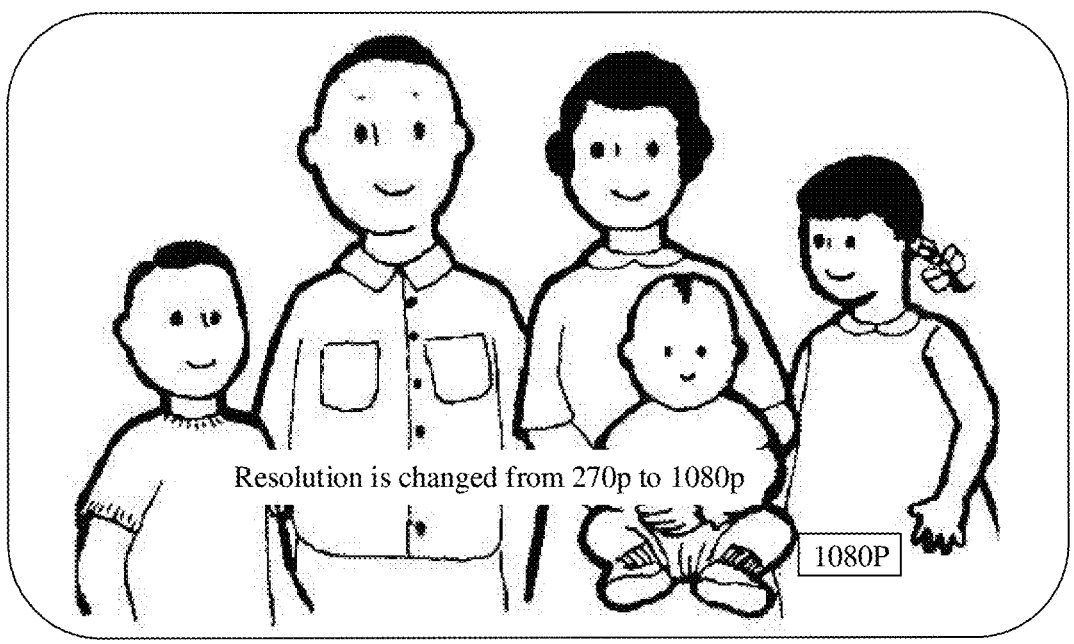

FIG. 6a to FIG. 6c are example schematic diagrams of a video resolution switching process.

As shown in FIG. 6a, there is a control for selecting resolution in a lower right corner of the video playing interface. In this case, currently-used resolution, for example, 270P, is displayed on the control. A pull-up menu is displayed after the control is clicked. That 270P is underlined means that 270P is the currently-used resolution of the video. As long as the resolution is not the highest resolution, the user can select resolution higher than the current resolution.

As shown in FIG. 6b, the user selects one resolution from resolution higher than the current resolution. In this case, the terminal receives a resolution change instruction generated based on the operation, and further adjusts the resolution of the video that is being played by using the method in the embodiment shown in FIG. 4. Specifically, super-resolution processing is performed on an image frame in the video.

As shown in FIG. 6c, after super-resolution processing is performed, the resolution of the video is switched to the resolution selected by the user, and words "the resolution is switched from 270P to 1080P" are displayed on the playing interface. In this case, the currently-used resolution, for example, 1080P, is displayed on the control. In addition, the user can obviously see that the video played at this time is much clearer than that before the resolution is changed.

It should be noted that FIG. 5a to FIG. 5c and FIG. 6a to FIG. 6c are examples provided in the present disclosure, and do not constitute any limitation. The video playing process and the video resolution switching process including a display interface implementation, a control implementation, a resolution representation manner (for example, standard definition, high definition, and ultra-high definition), a resolution switching manner and the like may alternatively be implemented in another manner. This is not specifically limited in the present disclosure.

Figure 7:
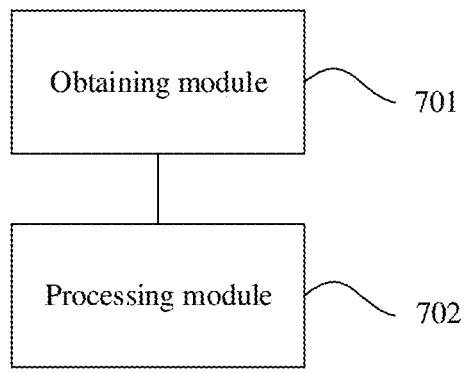
FIG. 7 is a schematic diagram of a structure of an embodiment of a terminal apparatus according to the present disclosure.

FIG. 7 is a schematic diagram of a structure of an embodiment of a terminal apparatus according to the present disclosure. As shown in FIG. 7, the apparatus may be used in the terminal shown in FIG. 2. The terminal apparatus in this embodiment may include an obtaining module 701 and a processing module 702.

The obtaining module 701 is configured to: obtain super-resolution reference information, where the super-resolution reference information includes a quantization parameter and an image quality score set, and the image quality score set includes image quality scores of a plurality of image frames; select M image frames from the plurality of image frames based on the image quality score set, where M is greater than or equal to 1; and obtain a video super-resolution network corresponding to the quantization parameter, where the video super-resolution network has a super-resolution function. The processing module 702 is configured to input the M image frames and a first image frame into the video super-resolution network, where the video super-resolution network is configured to perform super-resolution processing on the first image frame based on the M image frames to obtain a second image frame, and resolution of the second image frame is higher than resolution of the first image frame.

In a possible implementation, the obtaining module 701 is specifically configured to: when the plurality of image frames include a first image frame set, and a quantity of image frames in the first image frame set is greater than or equal to M, select the M image frames from the first image frame set, where image quality scores of the image frames included in the first image frame set each are higher than an image quality score of the first image frame.

In a possible implementation, the M image frames include the first M image frames that are obtained after the image frames in the first image frame set are arranged in descending order of image quality scores.

In a possible implementation, the super-resolution reference information further includes reference frame indication information of the first image frame. The obtaining module 701 is further configured to: when the plurality of image frames includes the first image frame set, and the quantity of image frames in the first image frame set is less than M, select all image frames from the first image frame set, where the image quality scores of the image frames included in the first image frame set each are higher than the image quality score of the first image frame; when a quantity of all the image frames is less than M, select image frames corresponding to the reference frame indication information from the plurality of image frames; and when a sum of the quantity of all the image frames and a quantity of image frames corresponding to the reference frame indication information is less than M, select, from image frames other than all the image frames and the image frames corresponding to the reference frame indication information in the plurality of image frames, at least one image frame whose time intervals between the at least one image frame and the first image frame are in ascending order until the M image frames are selected.

In a possible implementation, the super-resolution reference information further includes the reference frame indication information of the first image frame. The obtaining module 701 is further configured to: when the plurality of image frames does not include the first image frame set, determine whether the first image frame is an I frame, where the image quality scores of the image frames included in the first image frame set each are higher than the image quality score of the first image frame, and if the first image frame is the I frame, the M image frames include M replicated samples of the first image frame; if the first image frame is not the I frame, select the image frames corresponding to the reference frame indication information from the plurality of image frames; and when the quantity of image frames corresponding to the reference frame indication information is less than M, select, from image frames other than the image frames corresponding to the reference frame indication information in the plurality of image frames, the at least one image frame whose time intervals between the at least one image frame and the first image frame are in ascending order until the M image frames are selected.

In a possible implementation, the obtaining module 701 is specifically configured to receive the super-resolution reference information sent by a transmit end.

In a possible implementation, the quantization parameter includes a quantization parameter used in a process in which the transmit end performs quantization processing on the first image frame.

In a possible implementation, the plurality of image frames includes a plurality of consecutive image frames in the video stream, and the plurality of image frames include the first image frame.

In a possible implementation, the video super-resolution network includes a convolutional neural network (CNN), a deep neural network (DNN), or a recurrent neural network (RNN).

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

The apparatus in this embodiment may be configured to execute the technical solution in the method embodiment shown in FIG. 4. Implementation principles and technical effect thereof are similar, and details are not described herein again.

Figure 8:
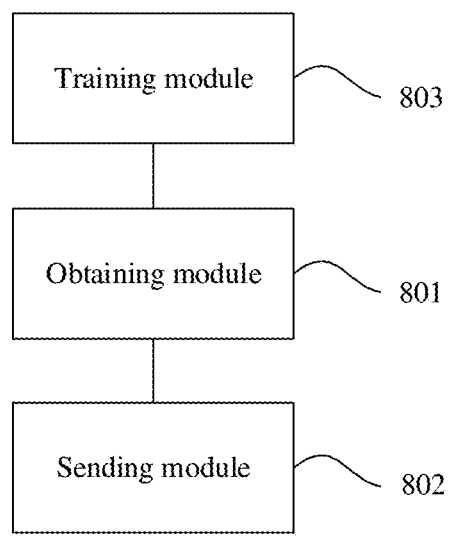
FIG. 8 is a schematic diagram of a structure of an embodiment of a transmit apparatus according to the present disclosure.

FIG. 8 is a schematic diagram of a structure of an embodiment of a transmit apparatus according to the present disclosure. As shown in FIG. 8, the apparatus may be used in a transmit end. The transmit apparatus in this embodiment may include an obtaining module 801, a sending module 802, and a training module 803.

The obtaining module 801 is configured to: obtain a quantization parameter of a first image frame; and obtain an image quality score of the first image frame based on the first image frame and a reconstructed frame of the first image frame. The sending module 802 is configured to send a video stream and super-resolution reference information to a terminal apparatus, where the video stream includes the first image frame, and the super-resolution reference information includes the quantization parameter and the image quality score.

In a possible implementation, the obtaining module 801 is further configured to obtain reference frame indication information of the first image frame. Correspondingly, the super-resolution reference information further includes the reference frame indication information.

In a possible implementation, the obtaining module 801 is specifically configured to obtain the image quality score of the first image frame based on a peak signal-to-noise ratio (PSNR), structural similarity index measure (SSIM), or video multimethod assessment fusion (VMAF).

In a possible implementation, the video super-resolution network includes a convolutional neural network (CNN), a deep neural network (DNN), or a recurrent neural network (RNN).

In a possible implementation, the video super-resolution network includes a convolutional layer and an activation layer.

In a possible implementation, a depth of the convolutional layer is 2, 3, 4, 5, 6, 16, 24, 32, 48, 64, or 128; and a size of a convolution kernel at the convolution layer is 1×1, 3×3, 5×5, or 7×7.

In a possible implementation, the apparatus further includes the training module 803. The obtaining module 801 is further configured to: obtain a training data set, where the training data set includes a first-resolution image and a second-resolution image of each of a plurality of image frames, and a plurality of quantization parameters. Resolution of the first-resolution image is higher than resolution of the second-resolution image. The training module 803 is configured to perform training based on the training data set to obtain a plurality of video super-resolution networks, where the plurality of video super-resolution networks corresponds to the plurality of quantization parameters.

The apparatus in this embodiment may be configured to execute the technical solution in the method embodiment shown in FIG. 4. Implementation principles and technical effect thereof are similar, and details are not described herein again.

In an implementation process, steps in the foregoing method embodiments may be implemented by using a hardware integrated logical circuit in a processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in the present disclosure may be directly performed by a hardware encoding processor, or may be performed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

The memory in the foregoing embodiments may be a volatile memory or a non-volatile memory, or may include both a volatile memory and a non-volatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache.

Through an example rather than a limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

Persons of ordinary skill in the art may be aware that, in combination with the examples described in embodiments disclosed in this specification, units and algorithm steps may be implemented by electronic hardware or a combination of computer software and electronic hardware. Whether a function is performed by hardware or software depends on particular applications and design constraints of the technical solutions. Persons skilled in the art may use different methods to implement the described functions for each particular application, but it should not be considered that the implementation goes beyond the scope of the present disclosure. It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed systems, apparatuses, and methods may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected according to actual needs to achieve the objectives of the solutions of embodiments.

In addition, functional units in embodiments of the present disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the present disclosure essentially, or the part contributing to the conventional technology, or the part of the technical solutions may be implemented in a form of a software product. The computer software product is stored in a storage medium and includes several instructions for instructing a computer device (a personal computer, a server, a network device, or the like) to perform all or a part of the steps of the methods in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing description is merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. An image frame super-resolution implementation method, comprising:
   obtaining super-resolution reference information, wherein the super-resolution reference information comprises a quantization parameter and an image quality score set, and the image quality score set comprises image quality scores of a plurality of image frames in a video stream;
   selecting M image frames from the plurality of image frames based on the image quality score set, wherein M is greater than or equal to 1;
   obtaining a video super-resolution network corresponding to the quantization parameter, wherein the video super-resolution network has a super-resolution function; and
   inputting the M image frames and a first image frame into the video super-resolution network, wherein the video super-resolution network is configured to perform super-resolution processing, via the super-resolution function, on the first image frame based on the M image frames to obtain a second image frame, and a resolution of the second image frame is higher than a resolution of the first image frame,
   wherein the super-resolution reference information further comprises reference frame indication information of the first image frame, the reference frame indication information indicating one or more reference image frames; and the selecting M image frames from the plurality of image frames based on the image quality score set further comprises:

when the plurality of image frames comprises a first image frame set, and a quantity of image frames in the first image frame set is less than M, selecting all image frames from the first image frame set, wherein image quality scores of the image frames comprised in the first image frame set each are higher than the image quality score of the first image frame;

when a quantity of all the image frames is less than M, selecting image frames corresponding to the reference frame indication information from the plurality of image frames; and when a sum of the quantity of all the image frames and a quantity of image frames corresponding to the reference frame indication information is less than M, selecting, from image frames other than all the image frames and the image frames corresponding to the reference frame indication information in the plurality of image frames, at least one image frame until the M image frames are selected, wherein time intervals between the at least one image frame and the first image frame are in ascending order.

2. The method according to claim 1, wherein the selecting M image frames from the plurality of image frames based on the image quality score set further comprises:

when the plurality of image frames comprises the first image frame set, and the quantity of image frames in the first image frame set is greater than or equal to M, selecting the M image frames from the first image frame set, wherein image quality scores of the image frames comprised in the first image frame set each are higher than an image quality score of the first image frame.

3. The method according to claim 2, wherein the M image frames comprise the first M image frames that are obtained after the image frames in the first image frame set are arranged in descending order of image quality scores.

4. The method according to claim 1, wherein the super-resolution reference information further comprises reference frame indication information of the first image frame; and the selecting M image frames from the plurality of image frames based on the image quality score set further comprises:

when the plurality of image frames does not comprise the first image frame set, determining whether the first image frame is an I frame, wherein the image quality scores of the image frames comprised in the first image frame set each are higher than the image quality score of the first image frame, and the I frame is an image frame in the video stream for independent image encoding, and when the first image frame is the I frame, the M image frames comprise M replicated samples of the first image frame;

when the first image frame is not the I frame, selecting the image frames corresponding to the reference frame indication information from the plurality of image frames; and when the quantity of image frames corresponding to the reference frame indication information is less than M, selecting, from image frames other than the image frames corresponding to the reference frame indication information in the plurality of image frames, at least one image frame until the M image frames are selected, wherein time intervals between the at least one image frame and the first image frame are in ascending order.

5. The method according to claim 1, wherein the obtaining super-resolution reference information comprises:

receiving the super-resolution reference information sent by a transmit end.

6. The method according to claim 1, wherein the quantization parameter comprises a quantization parameter used in a process in which a transmit end performs quantization processing on the first image frame.

7. The method according to claim 1, wherein the plurality of image frames comprises a plurality of consecutive image frames in the video stream, and the plurality of image frames comprises the first image frame.

8. The method according to claim 1, wherein the video super-resolution network comprises a convolutional neural network (CNN), a deep neural network (DNN), or a recurrent neural network (RNN).

9. The method according to claim 8, wherein the video super-resolution network comprises a convolutional layer and an activation layer.

10. The method according to claim 9, wherein a depth of the convolutional layer is 2, 3, 4, 5, 6, 16, 24, 32, 48, 64, or 128; and a size of a convolution kernel at the convolution layer is 1×1, 3×3, 5×5, or 7×7.

11. A terminal, comprising:

one or more processors; and a non-transitory computer-readable storage medium coupled to the one or more processors and storing instructions that, when executed by the one or more processors, cause the terminal to perform operations comprising:

obtaining super-resolution reference information including a quantization parameter and an image quality score set, wherein the image quality score set comprises image quality scores of a plurality of image frames in a video stream;

selecting M image frames from the plurality of image frames based on the image quality score set, wherein M is greater than or equal to 1, and the selecting M image frames from the plurality of image frames based on the image quality score set comprises: when the plurality of image frames comprises a first image frame set, and a quantity of image frames in the first image frame set is less than M, selecting all image frames from the first image frame set, wherein image quality scores of the image frames comprised in the first image frame set each are higher than the image quality score of the first image frame;

obtaining a video super-resolution network corresponding to the quantization parameter, wherein the video super-resolution network has a super-resolution function; and inputting the M image frames and a first image frame into the video super-resolution network, wherein the video super-resolution network is configured to perform super-resolution processing, via the super-resolution function, on the first image frame based on the M image frames to obtain a second image frame, and a resolution of the second image frame is higher than a resolution of the first image frame.

12. The terminal of claim 11, wherein the selecting M image frames from the plurality of image frames based on the image quality score set further comprises:

when the plurality of image frames comprises the first image frame set, and the quantity of image frames in the first image frame set is greater than or equal to M, selecting the M image frames from the first image frame set, wherein image quality scores of the image frames comprised in the first image frame set each are higher than an image quality score of the first image frame.

13. The terminal of claim 12, wherein the M image frames comprise the first M image frames that are obtained after the image frames in the first image frame set are arranged in descending order of image quality scores.

14. The terminal of claim 11, wherein the super-resolution reference information further comprises reference frame indication information of the first image frame, the reference frame indication information indicating one or more reference image frames; and the selecting M image frames from the plurality of image frames based on the image quality score set further comprises:
  when a quantity of all the image frames is less than M, selecting image frames corresponding to the reference frame indication information from the plurality of image frames; and
  when a sum of the quantity of all the image frames and a quantity of image frames corresponding to the reference frame indication information is less than M, selecting, from image frames other than all the image frames and the image frames corresponding to the reference frame indication information in the plurality of image frames, at least one image frame until the M image frames are selected, wherein time intervals between the at least one image frame and the first image frame are in ascending order.

15. The terminal of claim 11, wherein the super-resolution reference information further comprises reference frame indication information of the first image frame; and the selecting M image frames from the plurality of image frames based on the image quality score set further comprises:
  When the plurality of image frames does not comprise the first image frame set, determining whether the first image frame is an I frame, wherein the image quality scores of the image frames comprised in the first image frame set each are higher than the image quality score of the first image frame, and the I frame is an image frame in the video stream for independent image encoding, and
  when the first image frame is the I frame, the M image frames comprise M replicated samples of the first image frame;
  when the first image frame is not the I frame, selecting the image frames corresponding to the reference frame indication information from the plurality of image frames; and
  when the quantity of image frames corresponding to the reference frame indication information is less than M, selecting, from image frames other than the image frames corresponding to the reference frame indication information in the plurality of image frames, at least one image frame until the M image frames are selected, wherein time intervals between the at least one image frame and the first image frame are in ascending order.

* * * * *